United States Patent [19]
Jodoin et al.

[11] Patent Number: 6,143,047
[45] Date of Patent: Nov. 7, 2000

[54] EFFLUENT CONTAINMENT ASSEMBLY

[75] Inventors: Jean L. Jodoin, Crystal Lake; Christopher S. Barry; Charles M. Murphy, both of Lake in the Hills; Patrick A. Malloy, St. Charles; Jeffrey A. Kennedy, Algonquin; James J. Yunker, North Aurora, all of Ill.

[73] Assignee: Facilitec Corporation, Elgin, Ill.

[21] Appl. No.: 09/245,548

[22] Filed: Feb. 5, 1999

Related U.S. Application Data

[60] Provisional application No. 60/073,931, Feb. 6, 1998.

[51] Int. Cl.[7] ................................................. B01D 46/00
[52] U.S. Cl. ............................... 55/323; 55/486; 55/511; 55/DIG. 36; 126/299 R
[58] Field of Search ............................ 55/486, 487, 323, 55/321, DIG. 31, DIG. 36, 494, 510, 511, 501; 454/49; 126/299 R, 299 E, 299 D, 300, 301

[56] References Cited

U.S. PATENT DOCUMENTS

| | | |
|---|---|---|
| 3,566,585 | 3/1971 | Voloshen et al. . |
| 3,660,969 | 5/1972 | Fox . |
| 3,695,164 | 10/1972 | Stalker . |
| 3,760,566 | 9/1973 | Zievers et al. . |
| 4,323,373 | 4/1982 | Fritz . |
| 4,325,290 | 4/1982 | Wolfert . |
| 4,350,504 | 9/1982 | Daichuk . |
| 4,450,756 | 5/1984 | Kling . |
| 4,610,705 | 9/1986 | Sarnosky et al. . |
| 4,635,617 | 1/1987 | Simonsen . |
| 4,673,423 | 6/1987 | Yumlu . |
| 4,869,236 | 9/1989 | Blough . |
| 4,887,588 | 12/1989 | Rial . |
| 5,196,040 | 3/1993 | Malloy et al. . |
| 5,318,607 | 6/1994 | Malloy et al. . |
| 5,512,073 | 4/1996 | Mirza et al. . |
| 5,540,744 | 7/1996 | Renna ........................................ 55/323 |
| 5,567,216 | 10/1996 | Mirza et al. ............................... 55/323 |

*Primary Examiner*—Duane S. Smith
*Attorney, Agent, or Firm*—Trexler, Bushnell, Giangiorgi & Blackstone, Ltd.

[57] ABSTRACT

A containment assembly for collecting grease or other effluent that includes a layered composite of effluent filtering and trapping materials in the form of a separation filter, a center filter and a barrier layer disposed in a layered manner. The separation filter and center filter desirably include a polypropylene material and each have a different porosity. The separation filter, center filter and barrier layer may be disposed between a top and bottom spacer layer in a layered manner. The composite may be received within a frame assembly. The effluent containment assembly also may include flashing for deflecting the effluent away from the equipment or other effluent source, an assembly for securing the frame assembly to equipment or other source of effluent at an elevation relative to a roof or other surface to be protected, a pole assembly for holding the composite within the frame assembly, and a windbar assembly for holding the composite together during wind conditions.

54 Claims, 21 Drawing Sheets

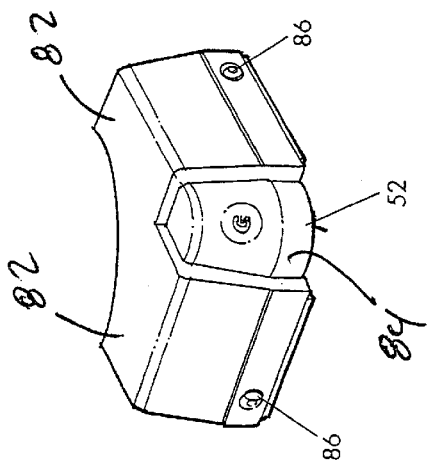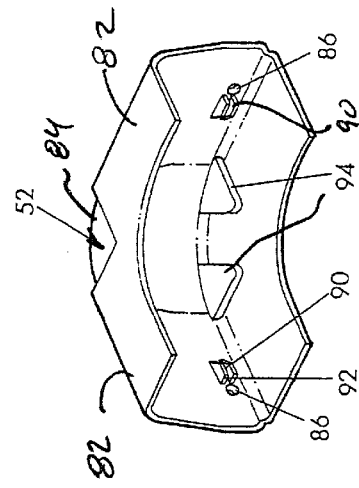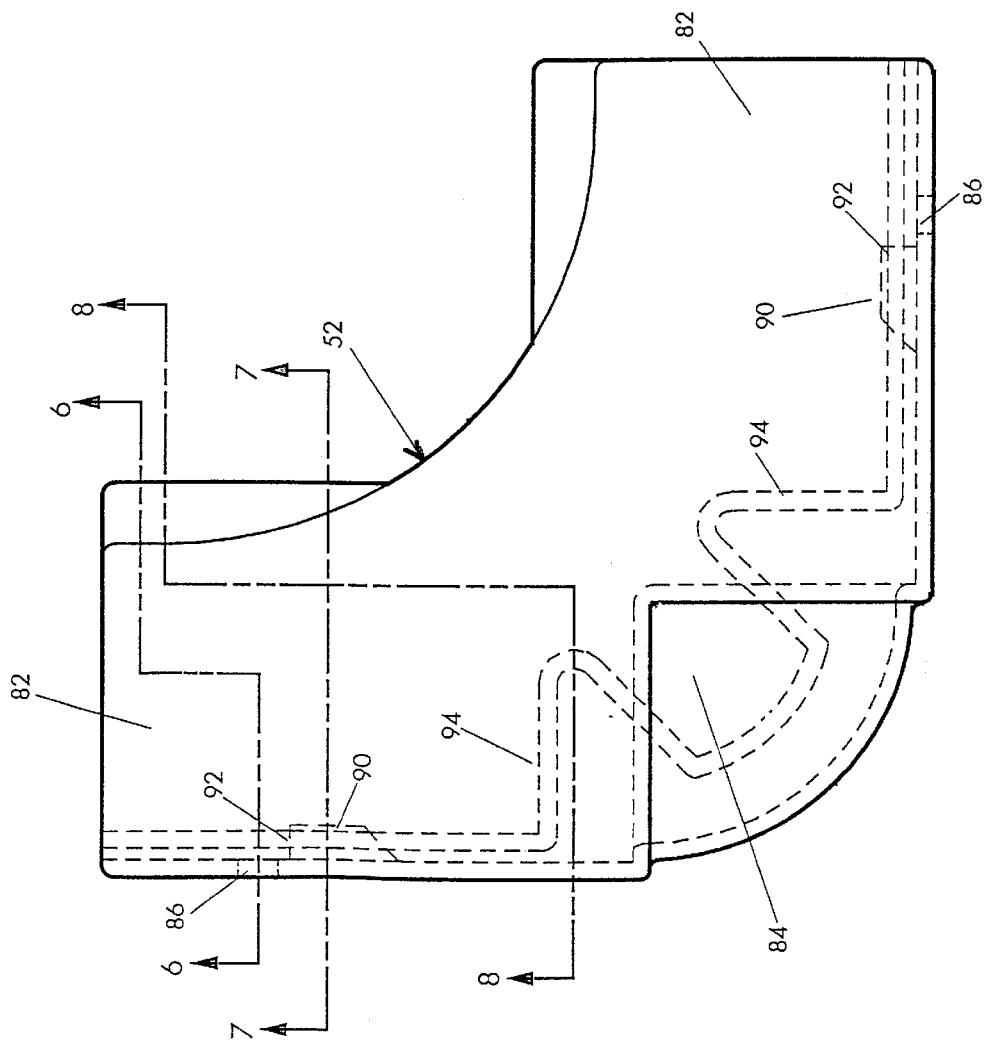

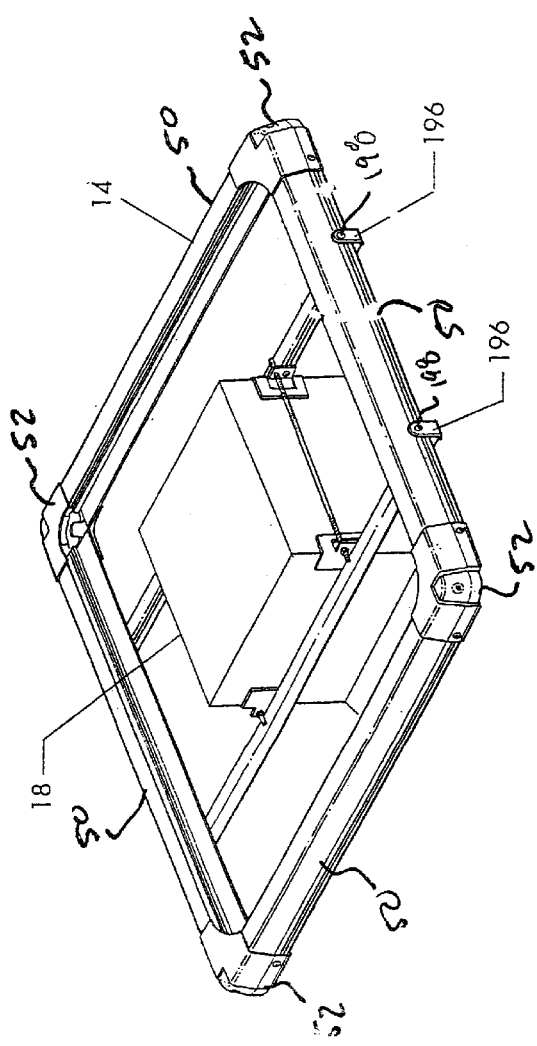
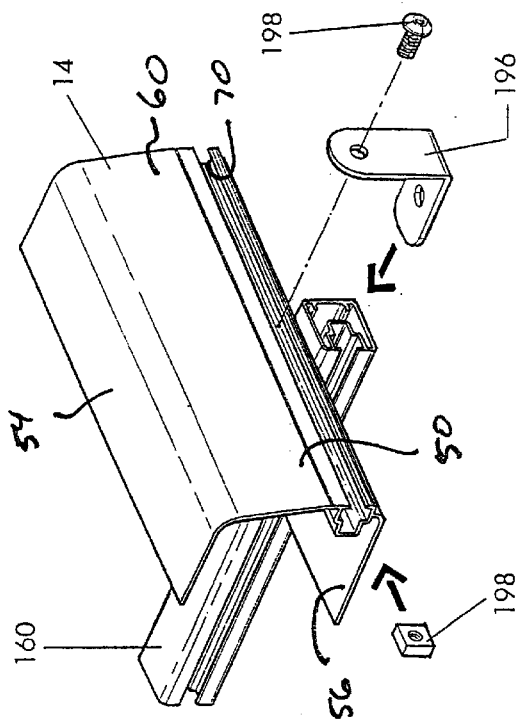
FIGURE 29
FIGURE 30

EFFLUENT CONTAINMENT ASSEMBLY

This application claims the benefit of U.S. Provisional Application Ser. No. 60/073,931, filed on Feb. 6, 1998.

The present invention relates to containment systems for collecting and disposing of air-borne or leaking grease, oil, residue or other effluent discharged by ventilation systems, leaking equipment or other sources.

BACKGROUND

Many facilities, such as restaurants, industrial facilities, and the like, employ equipment which require the discharge of high volumes of grease and oils through interior or exterior equipment, such as, for example, roof-mounted discharge vents. The discharged grease may accumulate on the roof or other surfaces and cause deterioration of the roofing or surface materials surrounding the grease discharge vent or other equipment associated with the vent installation. In the case of roofing materials, they are typically metal, synthetic, or organic materials which may deteriorate rapidly when exposed to grease. It has been known to position various types of grease containment assemblies around the discharge vent to trap and collect the grease discharged from the discharge vent or other equipment. However, there is a need for an effluent containment assembly that absorbs and traps greases and oils in a manner more efficient than the prior grease containment assemblies and in larger amounts than the prior containment assemblies. There is also a need for an effluent containment assembly that can be positioned relative to the equipment quickly and easily and, if desired, in an elevated manner.

Efforts have been made to develop devices and systems for collecting the discharge grease, such as, for example, the grease trap and filter apparatuses disclosed in U.S. Pat. Nos. 5,196,040; 5,318,607 and 5,512,073. The present invention, however, improves upon these prior grease trap and filter devices by providing a containment apparatus that provides many benefits over these prior devices.

In this regard, it is an object of the present invention to provide a containment assembly for collecting a large volume of grease, oils, residue or other effluent in an efficient manner.

It is a further object of the present invention to provide such an effluent containment assembly that includes a frame assembly that securely receives the effluent filtering and trapping materials and that is relatively easy to assembly and cost effective to manufacture.

It is a still further object of the present invention to provide such a effluent containment assembly that can be secured to a ventilation equipment or other equipment discharging the effluent at an elevation relatively quickly and easily.

It is a still further object of the present invention to provide such a effluent containment assembly that allows for convenient removal of the filtering and trapping materials from the frame assembly for periodic replacement without requiring disassembly of the frame structure.

SUMMARY

The present invention provides a containment assembly for collecting grease or other effluent that includes a layered composite of effluent filtering and trapping materials in the form of a separation filter layer, a center filter layer disposed below the separation filter layer and a barrier layer disposed below the center filter layer. The separation filter and center filter desirably each have a different porosity. The separation filter, center filter and barrier layer may be disposed between a top and bottom spacer layer. In a preferred embodiment, the composite is received within a frame assembly hereinafter described.

Depending on the application of the effluent containment assembly, the effluent containment assembly may be positioned adjacent any equipment or any other source of effluent, such as, for example, a discharge power ventilator of a kitchen ventilation system, HVAC equipment, exhaust stacks, leaking pipes, generators, motors, engines, manufacturing equipment, industrial equipment, etc. The frame assembly may be positioned to surround or abut or to extend near or underneath such equipment or other effluent source.

If desired, the effluent containment assembly in accordance with the present invention also may include flashing for deflecting the effluent away from the equipment or other effluent source, an assembly for securing the frame assembly to such equipment or effluent source at an elevation relative to a roof or other surface to be protected, pole assemblies for supporting the composite, and a windbar assembly for further securing the frame and the layered composite within the frame assembly where high wind condition prevails.

The separation filter of the composite desirably is adapted to repel at least some of any water present with the effluent, and is of high porosity sufficient to permit passage of the effluent therethrough. It also may include an ultraviolet inhibitor to resist degradation of the composite due to ultraviolet exposure. In a preferred embodiment, the separation filter desirably is comprised of a polypropylene or other suitable material.

The center filter is positioned generally below and in contact with the separation filter, and is adapted to absorb effluent passing through the separation filter and to repel at least some of any water included with the effluent. The center filter comprises a material having a porosity higher than the porosity of the material of the separation filter and an effluent absorbency rate greater than the effluent absorbency rate of the material of separation filter. The center filter desirably is comprised of a plurality of layers of meltblown polypropylene. The center filter is less porous and more effluent absorbent than the separation filter. As a result, the center filter tends to pull or absorb the effluent absorbed by the separation filter.

The barrier layer is positioned generally below and in contact with the center filter. The barrier layer is impervious to water, and is adapted to prevent water and the effluent from passing onto the roof or other surface. It desirably is constructed of a smooth impervious material to facilitate migration of any effluent coming in contact therewith to other portions of the center filter. In a preferred embodiment, the barrier layer is constructed entirely or substantially of polyethylene, polypropylene or other suitable materials. The separation and center filters and the barrier layer desirably are connected together by plastic barbs or other fasteners, an adhesive, or any other suitable means.

The top spacer layer is adapted to retain particulate debris, but to allow the effluent and water to pass readily therethrough. The bottom spacer layer is adapted to space the separation and center filters above any standing water and to promote air circulation and water evaporation. The top and bottom spacer layers desirably are highly porous and may include fire retardant polymers.

In accordance with a preferred embodiment, the layered composite also may include a fire shield layer positioned generally below and in contact with the bottom spacer layer.

The fire shield layer is intended to prevent any ignited effluent or flame associated therewith from reaching the roof or other surface. The fire shield layer may be comprised of impregnated fiberglass fabric, aluminized fiberglass fabric, galvanized sheet metal, or any other suitable material.

The frame assembly in accordance with a preferred embodiment of the invention desirably receives the layered composite. The frame assembly desirably is square or rectangular and comprises a plurality of elongated frame members and a plurality of corner members, with each corner member adapted to slidingly engaging a pair of frame members desirably for securing thereto by a pair of fasteners. Desirably, each frame member defines a channel for slidably receiving a metal strap secured to the corner member by the fasteners. Each frame member includes a bottom member adapted to support the composite. A pair of surfaces may be defined along the inner wall of each corner arm to abut the ends of the respective frame member to facilitate positioning of the frame members within the corner member.

The pole assembly for holding the layered composite may comprise a plurality of holding poles oriented in a grid pattern on the top side of the composite and another plurality of holding poles oriented in a grid pattern on the bottom side of the composite. The holding poles may be secured together in the grid patterns by a plurality of connectors or straps and desirably are lodged between the layered composite and the frame members. Additionally, the bottoms of the frame members provide further support for the holding poles at the bottom of the composite. The windbar assembly may comprise a plurality of windbars secured to, or otherwise associated with, the frame assembly. The windbars desirably extend across the top of the layered composite to prevent filters from being blown out of the frame assembly.

The flashing may be fastened to the discharge power ventilator or other equipment in any suitable manner such as by screws, adhesive or the like. Depending on the application of the effluent containment assembly, the flashing may include one or more side members, and if desired, one or more flashing corner members.

If desired, the layered composite may define a through aperture for receiving the discharge power ventilator or other suitable equipment. Additionally, if desired, the separation and center filters each may include sections to facilitate placement of the composite around the discharge power ventilator or other equipment. Each of the respective sections may include overlapping edges to form seams for sealing purposes.

When the effluent collection assembly is located on a roof, the filters desirably will follow the contours of the roof, which typically allow for water drainage. In many instances when effluent and moisture due to weather are present together, their combination presents a unique situation for the center filter. Since the center filter repels water, effluents which have a density less than that of water will tend to float on top of the water. The water finds its path traveling along the center filter eventually discharging off of the side. The effluent will travel on top of the water and discharge into the center filter. The result is a unique sorbing characteristic whereby the center filter quickly draws in the effluents as they come in contact with the separation filter with little regard to roof contours. The open porosity of the separation filter along with the highly absorbent center filter creates this action behind the separation filter. The result of this dual absorbing action helps the separation filter to quickly draw in the effluents. The material composition of the separation filter allows it to repel water. A portion of the water when introduced to the top surface of the separation filter, will find its path to the edge of the filter and discharge off of the side. As the effluents are pulled through the separation filter and contact the center filter, the effluents will be absorbed into the center filter.

The effluent containment assembly in accordance with a preferred embodiment of the present invention provides many advantages and has many applications. For example, the layered composite in accordance with the present invention has a relatively high effluent absorption rate and is also able to retain a high volume of effluent. The layered composite also can be tightly secured within the frame assembly quickly and easily. Additionally, the frame assembly in accordance with the present invention is easy to assemble and relatively cost effective to manufacture. It also can be readily and easily installed to equipment at an elevation. The effluent containment assembly minimizes the damaging effects of effluent discharged from the equipment or other effluent source.

BRIEF DESCRIPTION OF DRAWINGS

The present invention and the advantages thereof will become more apparent upon consideration of the following detailed description when taken in conjunction with the accompanying drawings of which:

FIG. 5(a) is a top plan view of one of the corner members of the frame assembly of the effluent containment assembly of FIG. 1, illustrating with dashed lines structure associated with the channel defined by the corner member;

FIG. 5(b) is a rear perspective view of the corner member of FIG. 5(a);

FIG. 5(c) is a front perspective view of the corner member of FIG. 5(a);

FIG. 29 is a perspective view of the elevated support assembly of FIG. 25 secured to a frame assembly of an effluent containment assembly in accordance with an embodiment of the invention;

FIG. 30 is a fragmentary exploded view illustrating one of the frame members of the frame assembly of FIG. 29, one of the elongated supports of the elevated support assembly of FIG. 29, and hardware for securing the frame member to the elongated support;

DETAILED DESCRIPTION OF THE PREFERRED EMBODIMENTS

Figure 1:
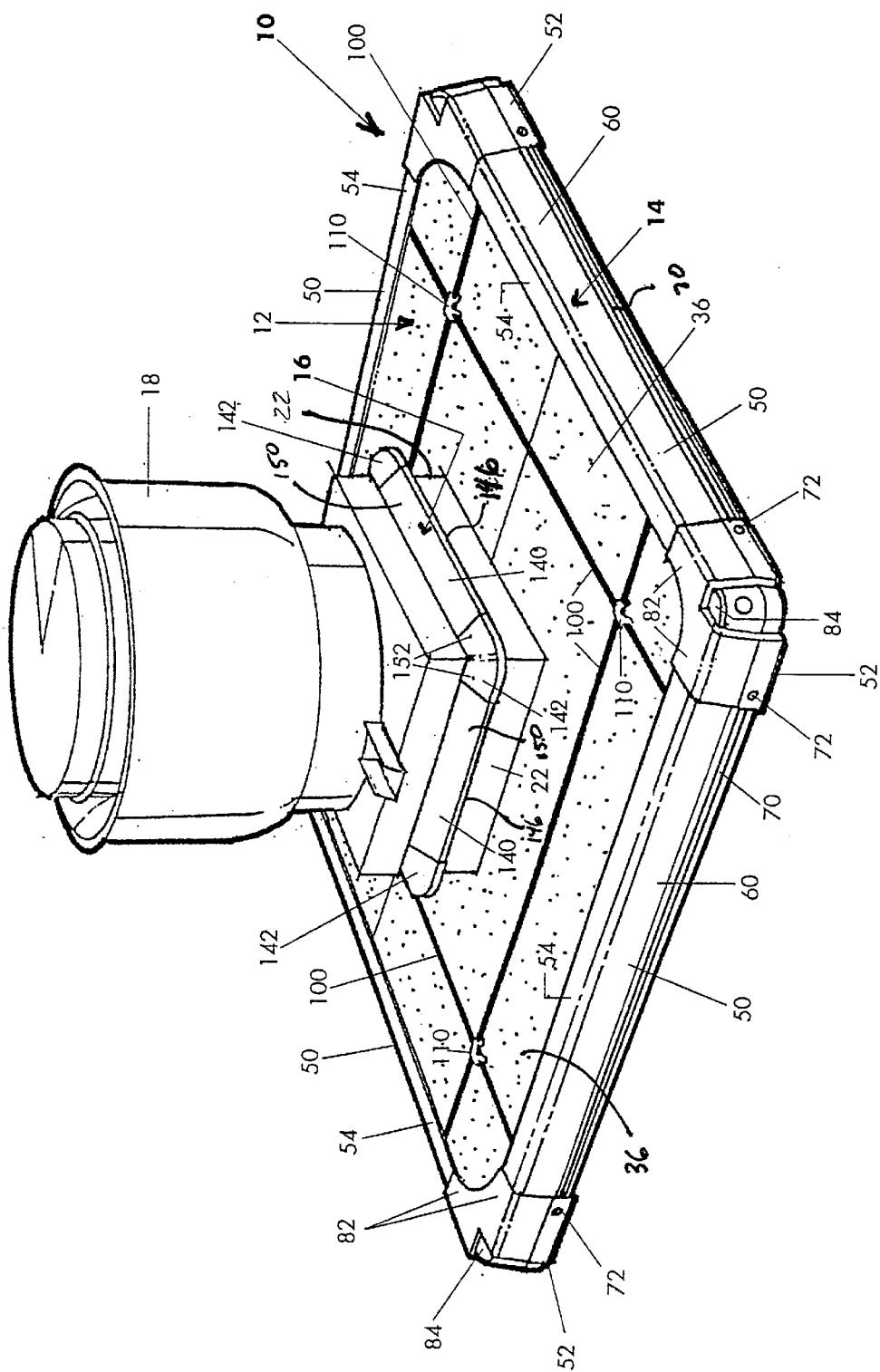
FIG. 1 is a perspective view of an effluent containment assembly in accordance with one embodiment surrounding a discharge power ventilator of a ventilation system.

FIG. 1 illustrates an effluent containment assembly 10, for collecting grease or other effluent, in connection with a preferred embodiment of the invention. The effluent containment assembly 10 comprises a layered composite 12 of effluent filtering and trapping materials, a frame assembly 14 receiving the layered composite, and flashing 16 for deflecting the discharged effluent onto the composite. FIG. 1 illustrates the effluent containment assembly 10 surrounding a roof discharge power ventilator 18. The illustrated layered composite 12 is square or rectangular, and defines a through aperture 20 to allow passage therethrough of all or a portion of equipment, such as, for example, a base 22 of the discharge power ventilator 18, for discharging effluent downwardly around the base (see e.g. FIG. 2, 3).

Figure 3:
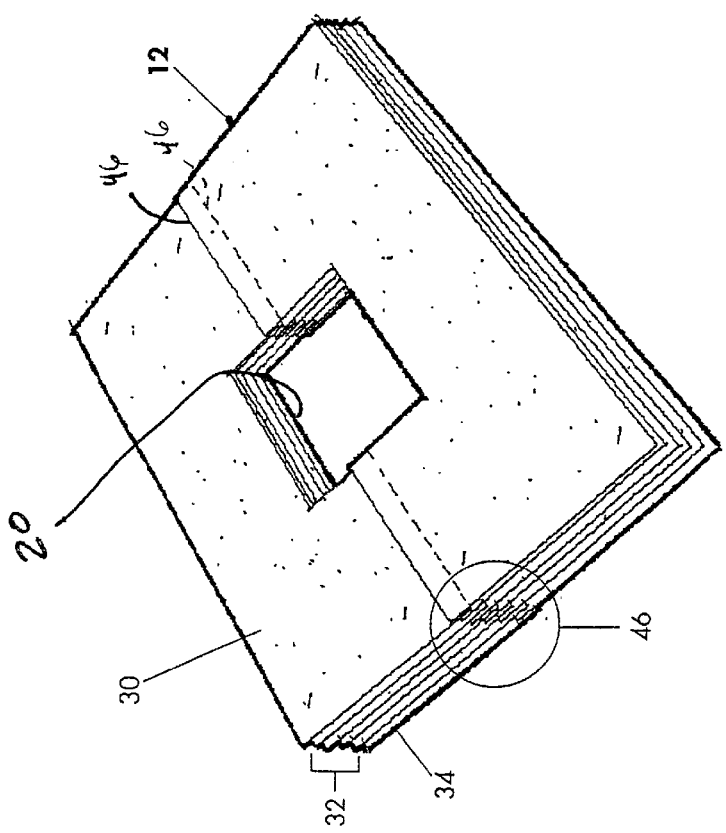
FIG. 3 is a perspective view of a layered composite of the effluent containment assembly in accordance with an other embodiment without the top and bottom spacer layers, illustrating the separation filter, the center filter, and the barrier layer each have first and second sections with overlapping edges to form seams.
Figure 2:
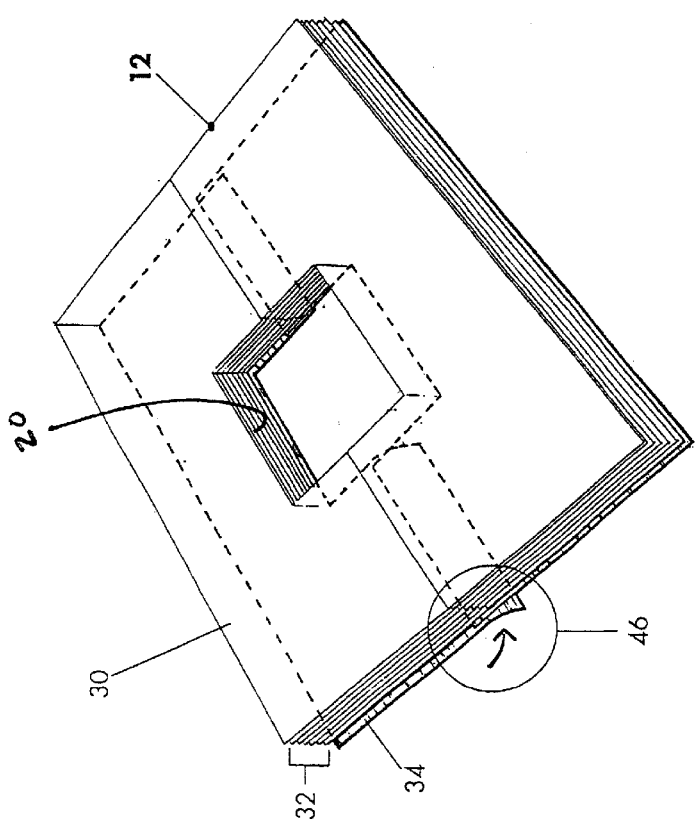
FIG. 2 is a perspective view of a layered composite of the effluent containment assembly of FIG. 1 without the top and bottom spacer layers, illustrating the separation filter, the center filter and the barrier layer of the layered composite each having aligning first and second sections with the edges of the first and second sections of the barrier layer overlapping to form a leak proof seam.
Figure 4:
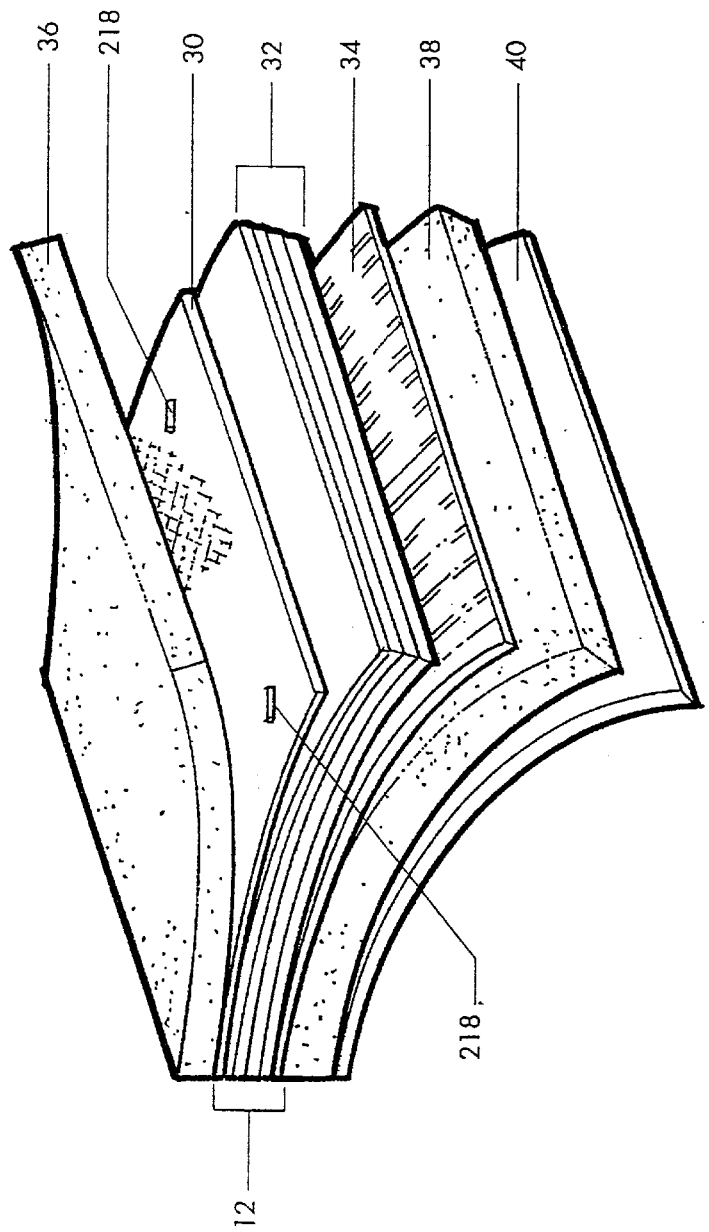
FIG. 4 is a fragmentary view of the layered composite of the effluent containment assembly of FIG. 1, schematic in nature, illustrating the effluent filtering and trapping materials.
Figure 7:
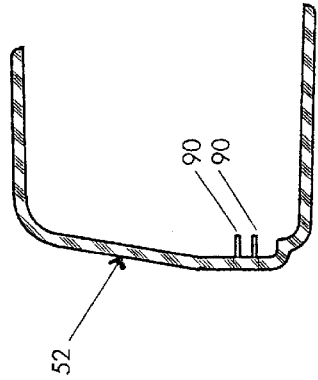
FIG. 7 is a cross section view taken along lines 7—7 of FIG. 5(a)
Figure 9:
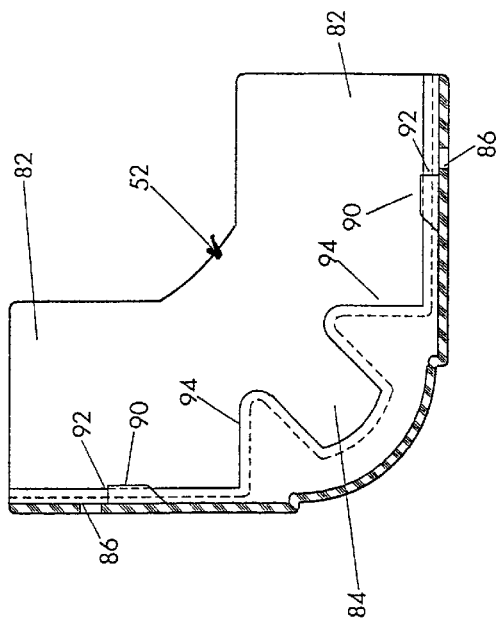
FIG. 9 is a cross section view taken along the length of the corner member of FIG. 5(a)
Figure 6:
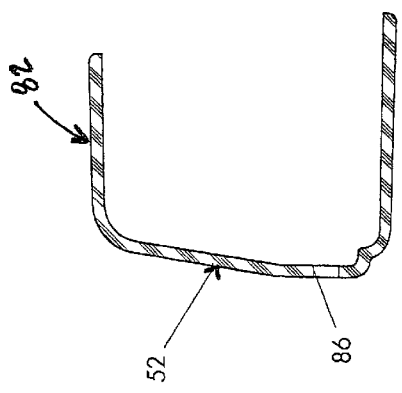
FIG. 6 is a cross section view taken along lines 6—6 of FIG. 5(a)
Figure 8:
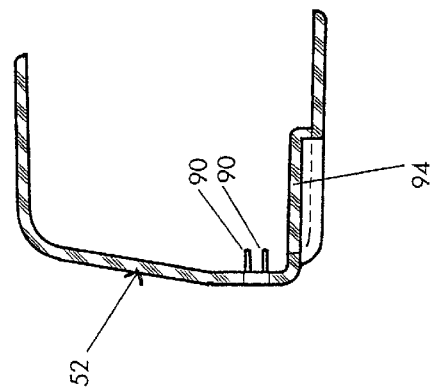
FIG. 8 is a cross section view taken along lines 8—8 of FIG. 5(a)
Figure 10:
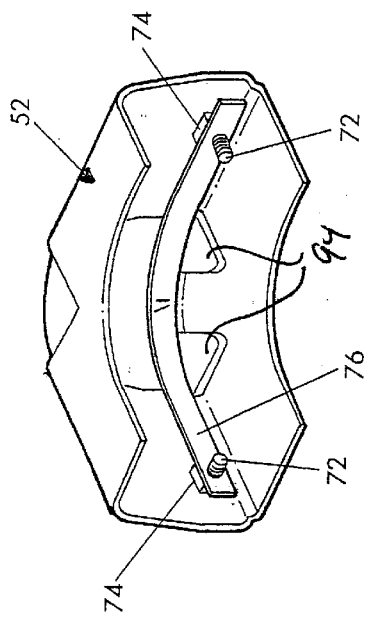
FIG. 10 is a front perspective view of the corner member of FIGS. 5(a)–5(c) having a sheet metal strap secured thereto by a pair of nuts and bolts for slidably engaging a pair of frame members of the frame assembly of the effluent containment assembly of FIG. 1.
Figure 11:
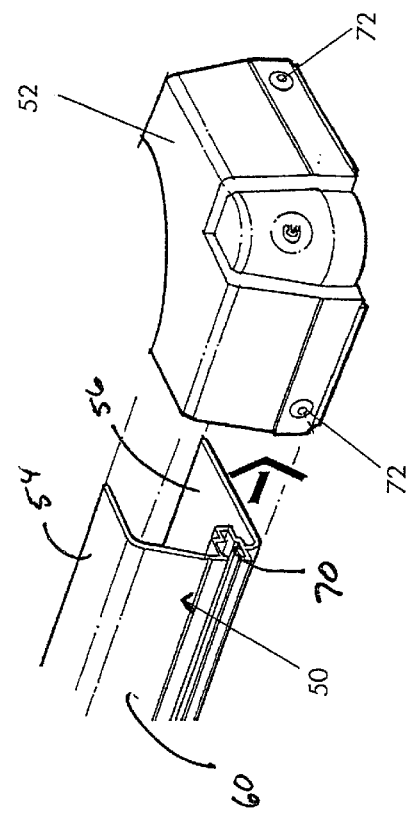
FIG. 11 is a rear perspective view of the corner member of FIG. 10 and one of the frame members of the frame assembly to be slidably engaged with the corner member.
Figure 12:
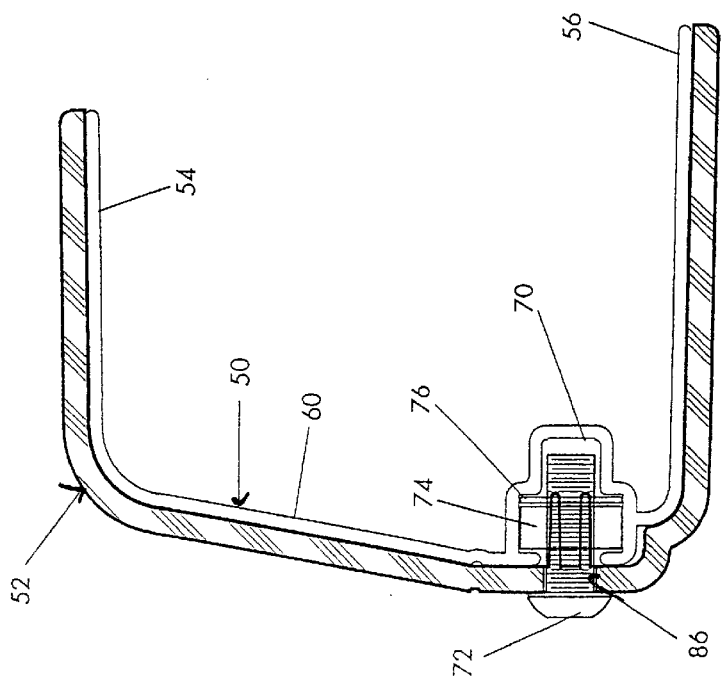
FIG. 12 is a cross section view of the corner member of FIG. 11 engaged with the frame member of FIG. 11.

As illustrated in FIGS. 2–4, the layered composite 12 comprises a separation filter layer 30, a center filter layer 32 positioned below and contacting the separation filter, and a barrier layer 34 positioned below and contacting the center filter. The separation and center filters 30 and 32 and barrier layer 34 are disposed between a top spacer layer 36 and a bottom spacer layer 38. The separation and center filters 30 and 32 desirably are both constructed of a polypropylene. The separation filter 30 has a higher porosity, but a less effluent-absorption rate, than the center filter 32. If desired, the separation and center filters 30 and 32 may each include two sections adapted to be mated or otherwise aligned together to facilitate placement of the composite 12 around the discharge power ventilator 18 or other equipment (see e.g. FIG. 2, 3). For example, the edges 46 of the two sections of the respective filters 30 may be in abutting contact with each other and 32 (FIG. 2) or may overlap each other to avoid gaps and form a seam (FIG. 3).

The separation filter 30 is highly porous and desirably is constructed of spunbound polypropylene material or other material of similar porosity. The separation filter 30 desirably includes a UV inhibitor to prevent or reduce degradation of the layered composite 12 due to ultraviolet exposure. An example of a suitable material for the separation filter 30 is the spunbound polypropylene fabric material commercially available from Non-Woven Fabric Division of Kimberly-Clark. The basis weight of such material desirably is 2.5 oz/sq. yd.

The center filter 32 is less porous than the separation filter 30 and desirably is constructed of a meltblown polypropylene. An example of a suitable material for the center filter 32 is the hydrophobic meltblown polypropylene sorbant commercially available from the Nonwoven Fabrics Division of Kimberly-Clark. This material is meltblown polypropylene having a range of basis weights from 2.0 to 12.0 oz/sq. yd. It can be unbonded, thermally pin bonded or mechanically sprocket bonded. The material can be treated with an antistat agent.

In the embodiment of FIG. 3, the center filter 32 comprises a plurality of layers of meltblown polypropylene positioned in a layered manner with overlapping edges, the number of which depends upon the application. In a typical installation for a kitchen ventilation system, for example, 4 to 8 layers of meltblown polypropylene often will be satisfactory.

The barrier layer 34 desirably is comprised of a smooth impervious material. For example, in a preferred embodiment, it may comprise 95% to 100% polyethylene. An example of a suitable material for the barrier layer 34 is the material commercially available from Reef Industries, Inc. of Houston, Tex., under the trade name Permalon X-100, which is described in the literature attached as Appendix B. The top and bottom spacer layers 36 and 38 are filters comprised of porous filtering material, such as, for example, foam polyester or a material of similar porosity. The barrier layer 34 may also comprise a pair of aligning sections with, if desired, overlapping edges to form a leak proof seam (FIGS. 2 and 3).

Desirably, the layered composite 12 further includes a fire shield layer 40 positioned below and contacting the bottom space layer intended to prevent any flame associated with any ignited effluent from reaching the roof surface. The fire shield layer 40 desirably comprises any suitable material that desirably is fire retardant and capable of withstanding high temperature. The material may, for example, be a silicone rubber impregnated fiberglass fabric, aluminized fiberglass fabric, or 20 to 24 gauge galvanized steel. In embodiments of the invention wherein the effluent containment assembly 10 is mounted on the side of equipment (see, e.g., FIGS. 23(a), 23(b), the fire shield layer 40 desirably is in the form of sheet metal (see FIG. 24).

Due to its construction, the layered composite 12 in accordance with a preferred embodiment absorbs effluent at a rate faster and in a manner more uniform than the prior grease containment assemblies. During discharge of effluent by equipment, such as the illustrated discharge power ventilator 18, or by an other source of effluent, liquid normally in the form of a grease or other oil-based effluent, water, or a combination of the effluent and water, is discharged. Other moisture, such as rain, snow or humid air, may also be present.

The liquid initially contacts and passes through the top spacer layer 36, which retains any solid debris to prevent it from passing therethrough. The effluent passing through the top spacer layer 36 is absorbed by the separation filter 30. A portion of water that is present is repelled by the separation filter 30, runs off the side of the separation filter 30, and falls onto the roof or other surface. Because the center filter 32 is less porous and has a higher effluent absorbency rate than the separation filter 30, the effluent absorbed by the separation filter 30 is then absorbed by the center filter 32. Because of its higher absorbency rate, the center filter 32 tends to pull the effluent from the separation filter 30 to the center filter 32. Water passing through the separation filter 30 is repelled by the center filter 32. Effluents which have a density less than that of water may float on top of the water. The separation filter 30 desirably provides friction for the traveling water which allows both the separation filter 30 and the center filter 32 to absorb any floating effluents before the water runs off the top of the center filter 32 at the sides.

The barrier layer 34 prevents any passage of effluent there beyond. Additionally, due to its smooth surface, the barrier layer 34 tends to facilitate a wicking effect of the center filter 32 because any effluent contacting the barrier layer 34 tends to migrate along the barrier layer 34 until it can be absorbed by another portion of the center filter 32. Thus, the barrier layer 34 tends to distribute the effluent so that it can be absorbed in a uniform manner, and, as a result, enables the composite 12 to trap a high volume of effluent. The barrier layer 34 also prevents water from passing upwardly therethrough from the roof or other surface to interfere with the center filter 32. Still further, due to its smooth surface, advertising matter or other indicia can be readily printed on the barrier layer 34. The bottom spacer layer 38 spaces the separation and center filters 30 and 32 and barrier layer 34 from the roof or other surface and also enhances air circulation beneath the barrier layer 34.

In accordance with a preferred embodiment of the invention, the frame assembly 14 receives the illustrated composite 12. The frame assembly 14 desirably is square or rectangular, or may have any other suitable shape. The illustrated frame assembly 14 comprises four elongated frame members 50 and four corner members 52. The frame members 50 desirably may be constructed of extruded aluminum or any other suitable material, and the corner members 52 may be constructed of an injection molded fire retardant polypropylene or any other suitable material. Each corner member 52 engages a pair of frame members 50.

Each frame member 50 is generally C-shaped, and includes a top member 54, a bottom member 56, and a side member 60 interconnecting the top and bottom members. The bottom member 56, which extends farther than the top member 54, is adapted to support the composite 12 and the bottom holding poles 102 hereinafter described. The side member 60 desirably defines a channel 70 along the length of the frame member 50. In a preferred embodiment, the channel 70 is extends inwardly and has a generally T-shaped cross section including contiguous subchannels 71 and 73.

Figure 13:
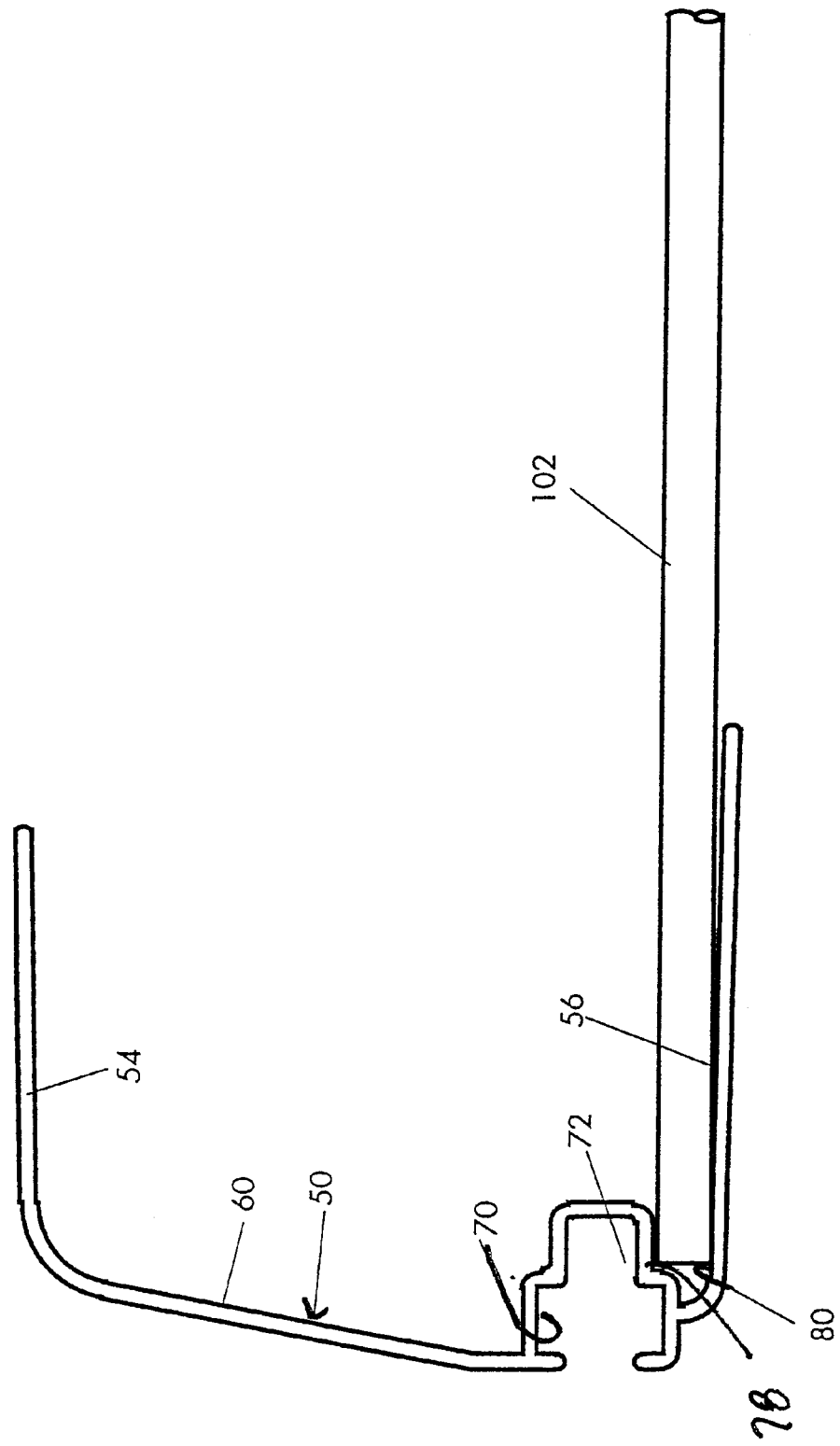
FIG. 13 is a side elevational side view of one of the frame members of the frame assembly of the effluent containment assembly of FIG. 1, also illustrating one of the bottom holding poles engaged therewith.
Figure 14:
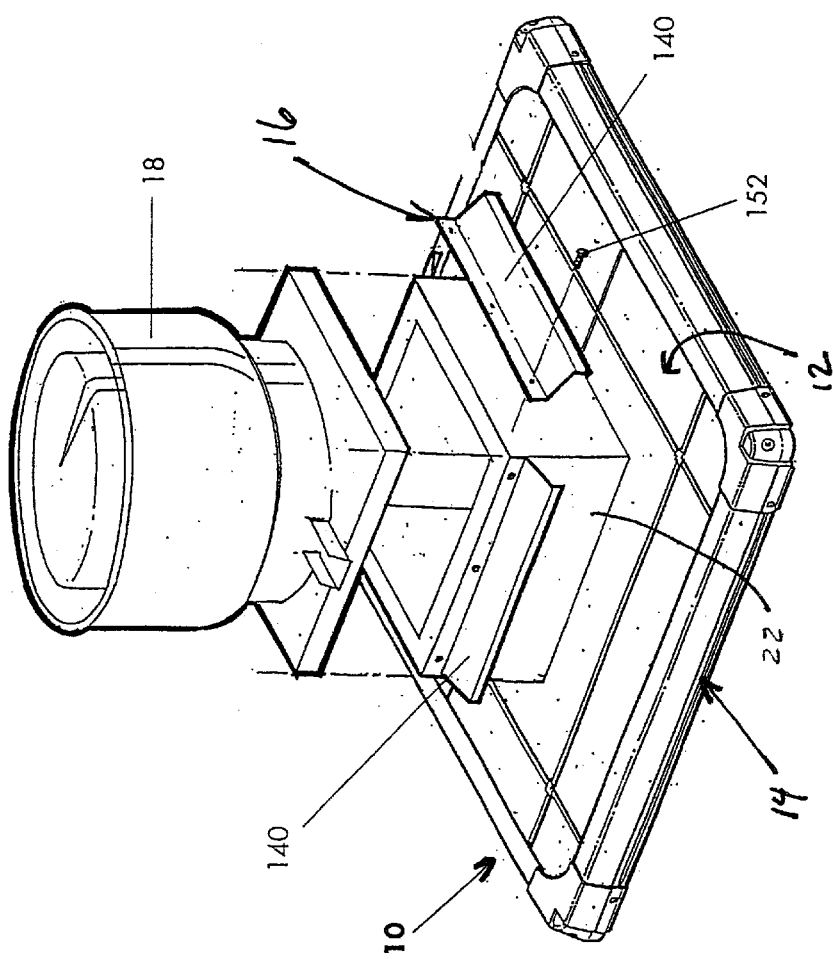
FIG. 14 is a perspective view of the effluent containment assembly of FIG. 1, illustrating in exploded view of the flashing installation on the discharge power ventilator with the corner flashing members removed.
Figure 15:
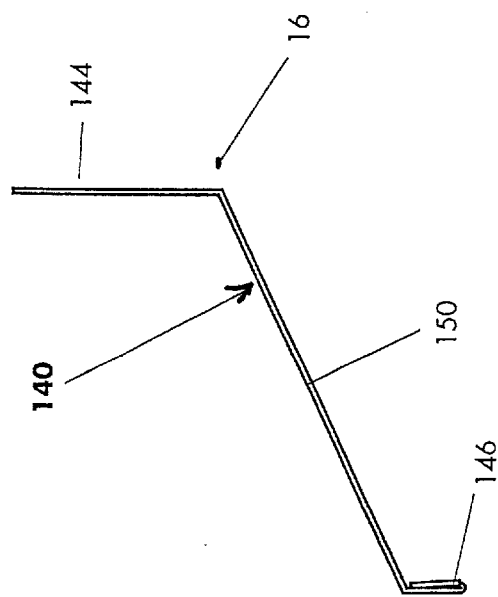
FIG. 15 is a side elevation view of one of the flashing side members of the effluent containment assembly of FIG. 14.
Figure 16:
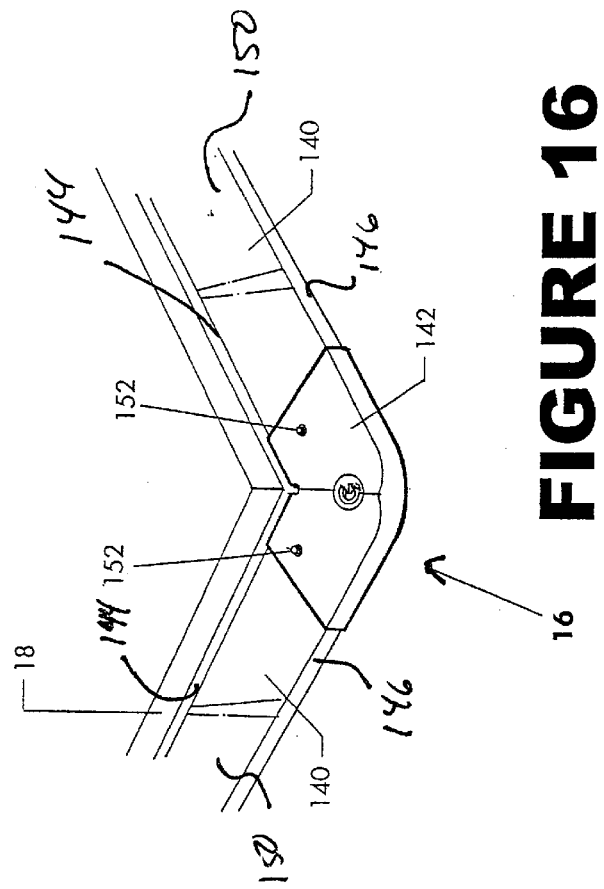
FIG. 16 is a partial perspective view of one of the corners of the effluent containment assembly of FIG. 15, illustrating the corners of the flashing.
Figure 17:
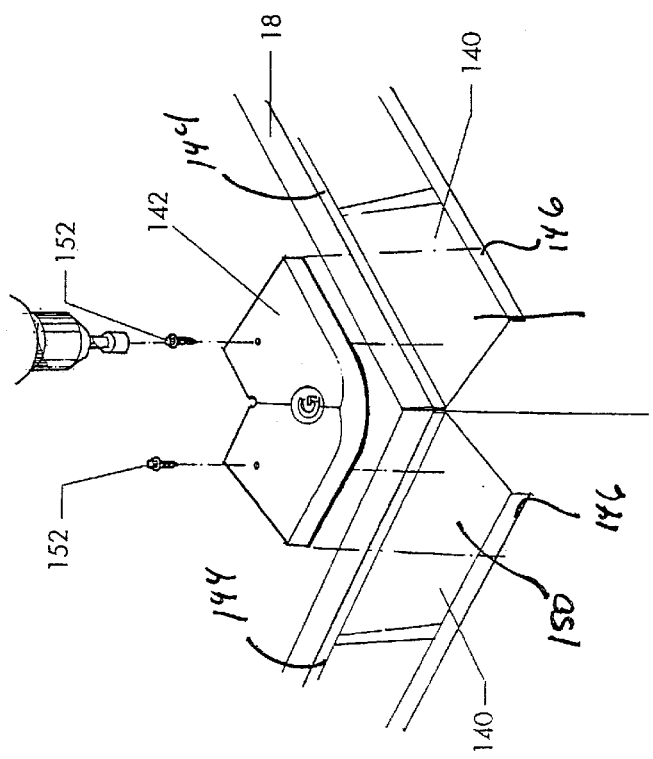
FIG. 17 is an exploded view of FIG. 16.
Figure 18:
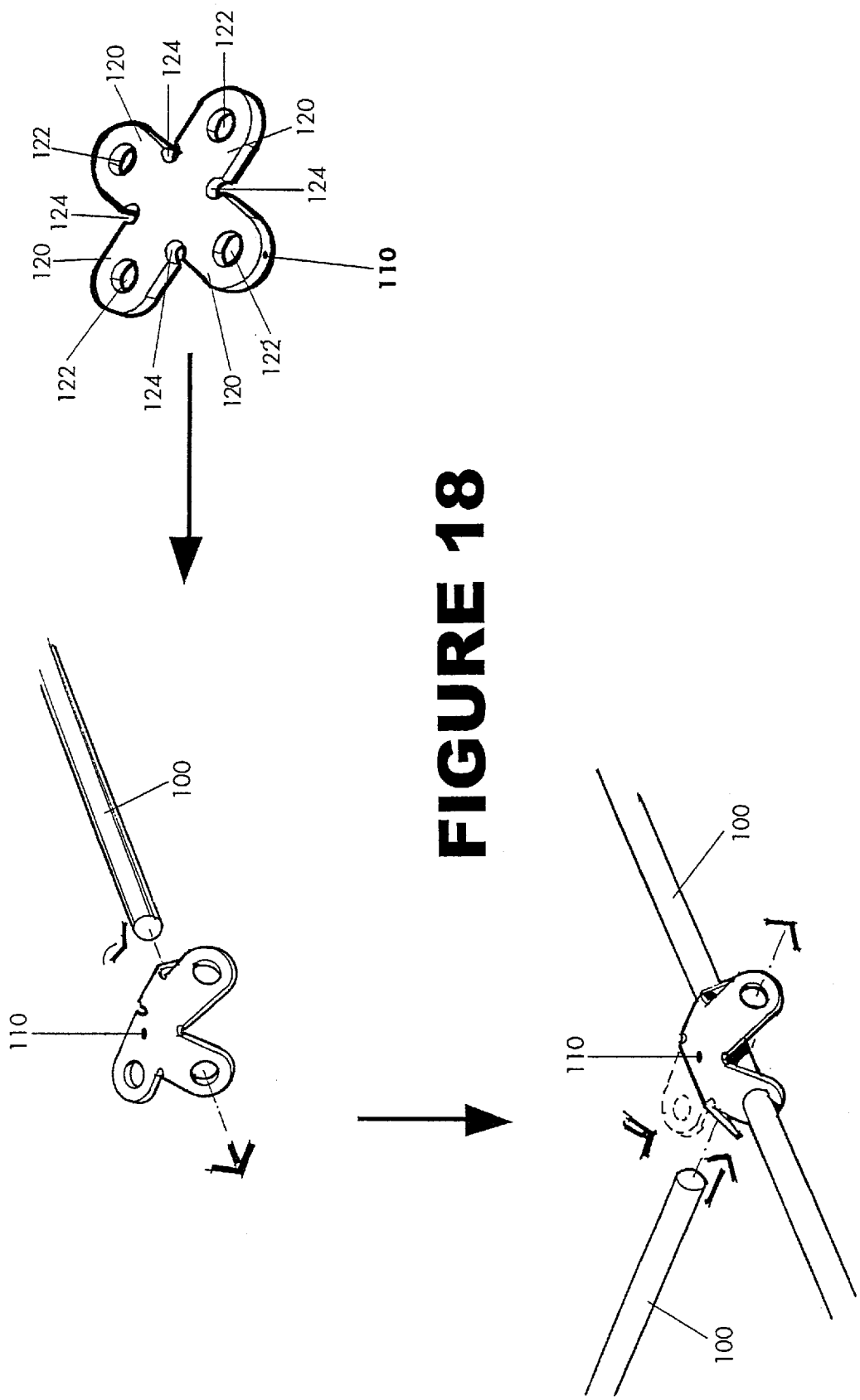
FIG. 18 is an operational view of one of the top holding pole connectors of the effluent containment assembly of FIG. 1, illustrating the holding pole connector being engaged with a pair of top holding poles of the effluent containment assembly of FIG. 1.

A curved metal strip 76 is secured to each corner member 52 by a pair of bolts and nuts 72 and 74 within a channel 75 defined by the corner member. Each end of the curved metal strip, a respective bolt 72 and nut 74 are slidingly received within the channel 70 of a respective frame member 50, with the bolt being received within the subchannel 73. Desirably, the height of the subchannel 73 is substantially the same as the width of the nut 74 so that the nut does not rotate during tightening of the bolt 72. The bottom holding poles 102 may be received within a bore 80 defined by the wall 78 defining the channel 70 and the bottom member 56, and engaged by the wall 78 and bottom member 56 (FIG. 13).

Each corner member 52 includes a pair of corner arms 82 extending from each other at an angle of about 90 degrees, and a rounded corner 84 joining the corner arms 82 together. Each corner arm 82 is also generally C-shaped for slidably receiving the respective frame member 50. Each corner arm 82 defines a pair of apertures 86 for receiving the bolts and nuts 72 and 74, and also includes a pair of spaced stops 90 to prevent rotation of the nut. The illustrated stops 90 are elongated and include a front face 92. The stop 90 is adapted to prevent rotation of the nut 74 during positioning of the frame member within the channel 75. A surface 94 is formed on the top surface of the bottom of each corner arm 82 for abutting the end of the respective frame member 50 to facilitate positioning of the frame members 50 within the corner arms.

The layered composite 12 is received by the frame members 50 and the corner members 52, and also may be further secured to the frame assembly 14 in any suitable manner, such as, for example, by a plurality of top holding poles 100 oriented in a grid pattern on the top side of the composite 12 and a plurality of the bottom holding poles 102 oriented in a grid pattern on the bottom side of the composite 12. The ends of the top holding poles 100 are lodged between the top of the fire shield layer 40 and the top members 54 of the frame members 50. The ends of the bottom holding poles are lodged between the bottom of the layered composite 12 and the bottom members 56 of the frame members 50. The holding poles 100 and 102 may be constructed of plastic or the like.

The holding poles may be secured together in the grid patterns by a plurality of connectors. In a preferred embodiment, for example, the connectors of the top holding poles 100 are secured together by the connectors 110 and the bottom holding poles are connected together by ties 112. Each connector 110 may be comprised of a flexible material, such as, for example, polyurethane, and is adapted to engage a pair of the top holding poles 100. The connector 110, which in its unflexed has a cross configuration, includes four arms 120, each of which defines a hole 122 for receiving one of the pair of top holding poles 100 after the connector has been flexed to engage the top holding poles. The illustrated connector 10 defines a plurality of bores 124 to facilitate flexing of the connector.

In a preferred embodiment, each of the ties 112 of the bottom holding poles 102 comprises of a ribbed leg 114 and a slotted catch 116. The ribbed leg 114 of each tie 112 is fed through its respective slotted catch 116 and is engaged with a pair of the bottom holding poles 102 by looping the tie 112 around the bottom holding poles as illustrated. The tie 112 may be constructed of any suitable material, such as, for example, polyurethane or the like.

Figure 23B:
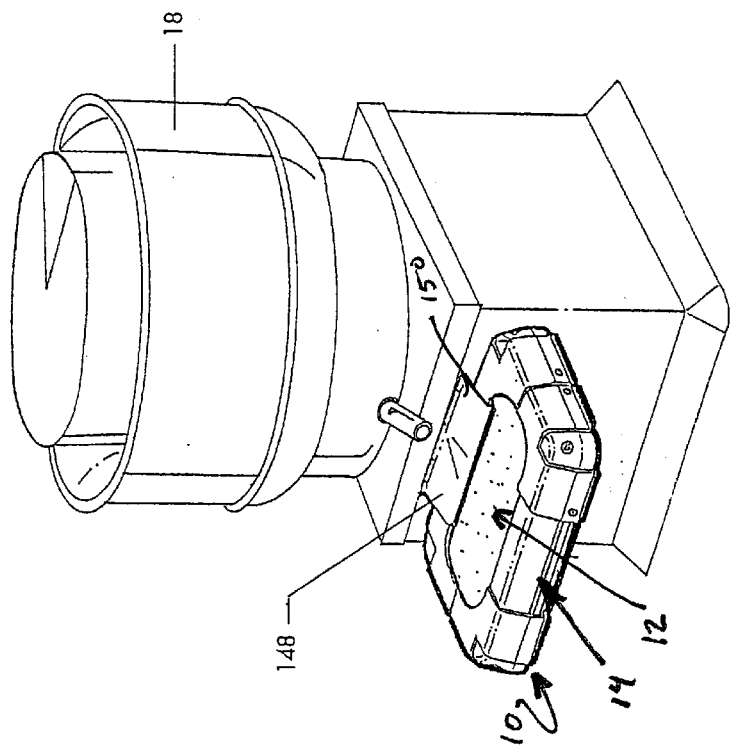
FIG. 23(b) is a perspective view of the effluent containment assembly of FIG. 23(a) secured adjacent the discharge ventilator and at an elevation.
Figure 23A:
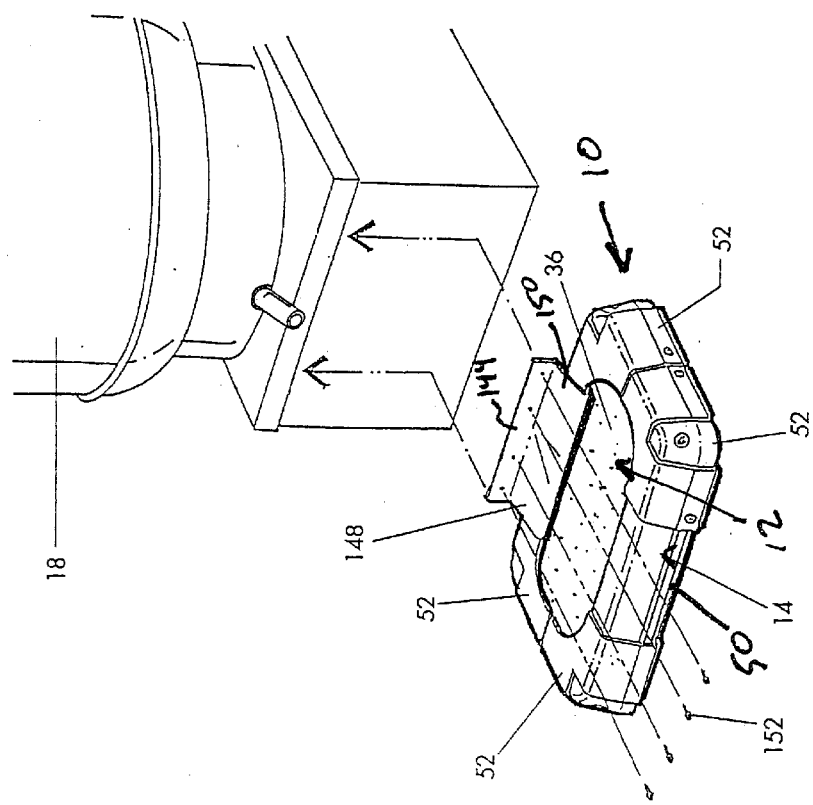
FIG. 23(a) is a perspective view of an effluent containment assembly being secured adjacent, but not surrounding, a discharge power ventilator of a ventilation system and at an elevation in accordance with an other embodiment of the invention.
Figure 24:
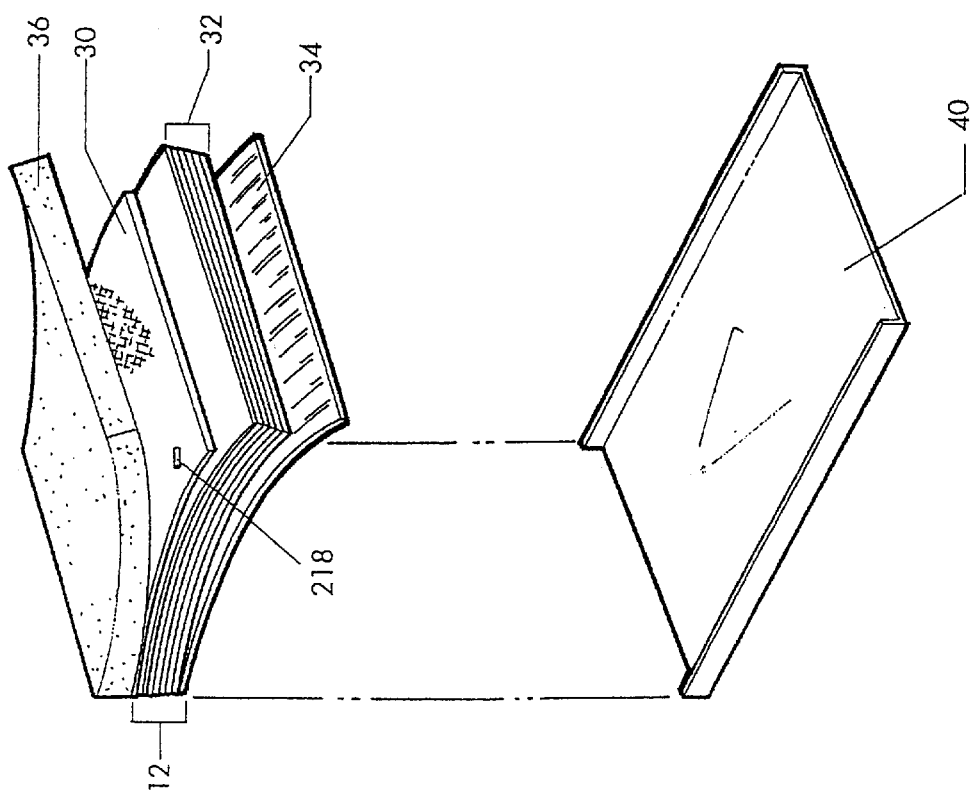
FIG. 24 is a perspective view of the layered composite of the effluent containment assembly of FIGS. 23(a)–23(b), illustrating the fire shield layer in the form of a sheet of sheet metal.
Figure 31:
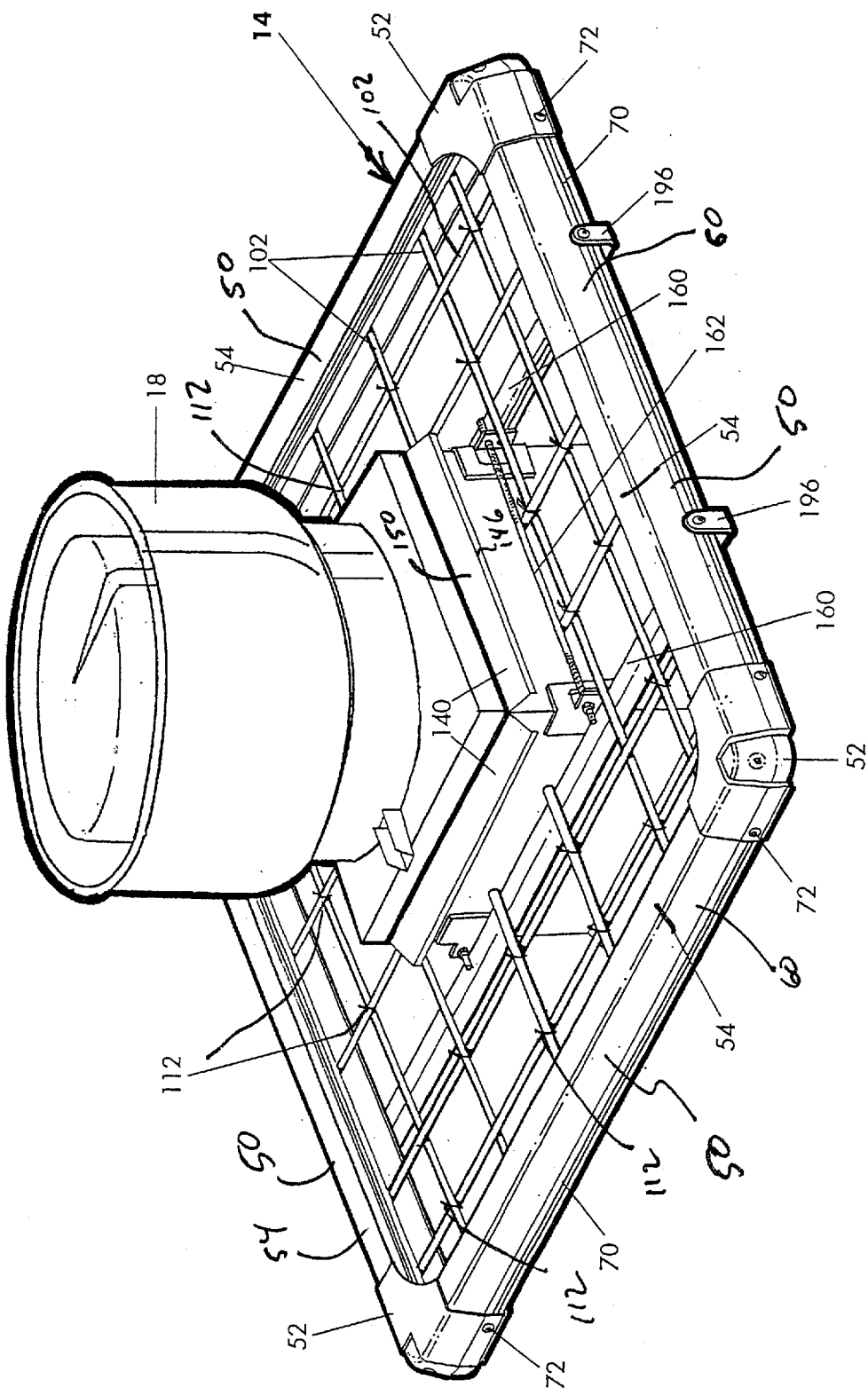
FIG. 31 is a perspective view of an effluent containment assembly in accordance with an other embodiment of the invention surrounding a discharge power ventilator of a ventilation system, illustrating the effluent containment assembly secured to the discharge ventilator at an elevation and also illustrating the layered composite and the top holding poles removed from the assembly to show the bottom holding poles for supporting the layered composite.
Figure 32:
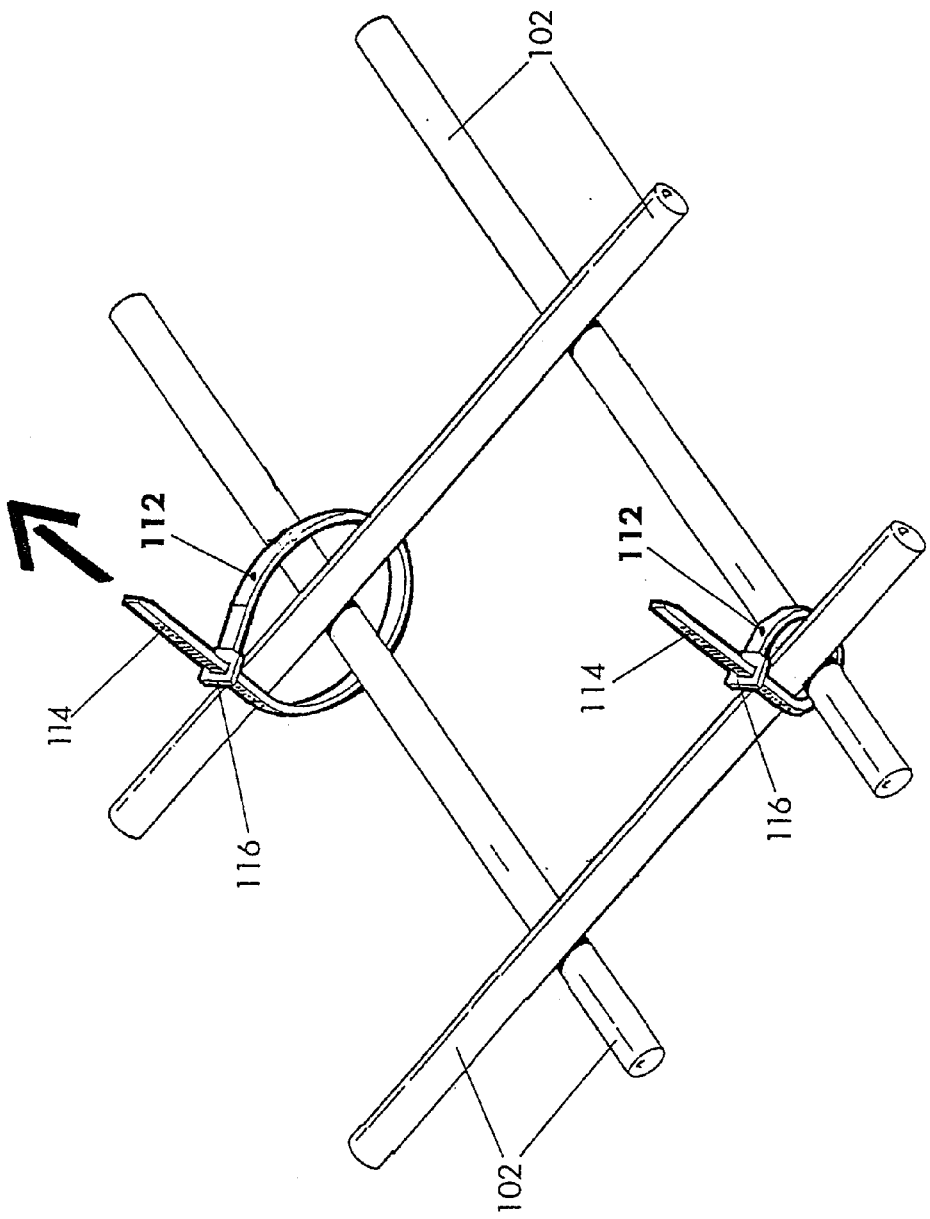
FIG. 32 is a fragmentary view, schematic in nature, of the bottom holding poles and bottom holding pole ties of FIG. 31.

The flashing 16 illustrated in FIG. 1 comprises four flashing side members 140 and four flashing corner members 142, which may be fastened to the discharge power ventilator 18 or other equipment in any suitable manner. Each flashing side member 140 includes vertically-extending top and bottom flanges 144 and 146 interconnected by an angled portion 150 adapted to direct the effluent downwardly and outwardly away from the discharge power ventilator 18 or other equipment. The top flange 144 may be fastened to the discharge power ventilator base or exhaust stack or any other suitable equipment in any suitable manner, such as by screws 152, adhesive or the like. In the illustrated embodiment, the bottom flange 144 is bent backward to increase rigidity and to avoid exposed sharp edges. The flashing corner member 142 is rounded, but otherwise has a cross section similar to that of the flashing side members 140. The flashing corner members 142 may be secured to the flashing side members 140 in any suitable manner, such as by screws 152, adhesive or the like. Depending on the application of the effluent containment assembly 10, the flashing corner members 142 may be omitted if desired (see FIG. 31). In FIGS. 23(a) and 23(b), for example, only a single flashing side member 148 is employed for attaching a side mount unit to the discharge power ventilator base.

The effluent containment assembly 10 in accordance with a preferred embodiment of the invention may have many applications. Depending on its application, it can be used to collect many different types of oil-based effluent, such as, for example, grease, oil, animal fat, petroleum-based effluent, various other residue, and various chemicals, and possibly other types of effluent. Additionally, depending on its application, the effluent containment assembly 10 can be positioned adjacent any type of equipment or any other source that discharges effluent as a normal part of its operation or due to leaks or the like. For example, the effluent containment assembly 10 may be positioned adjacent a grease discharge vent, a fan, various HVAC equipment, generators, motors, manufacturing equipment, industrial equipment, engines, pipes, or spouts. The effluent containment assembly 10 also may be positioned to surround or abut or to extend near or underneath all or a portion of such equipment or other source.

Figure 25:
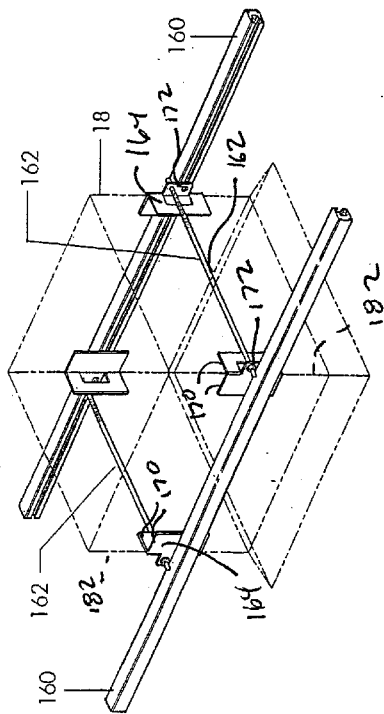
FIG. 25 is a perspective view of an elevated support assembly of an effluent containment assembly for supporting the frame assembly at an elevation and surrounding a discharge power ventilator in accordance with an other embodiment of the invention.
Figure 26:
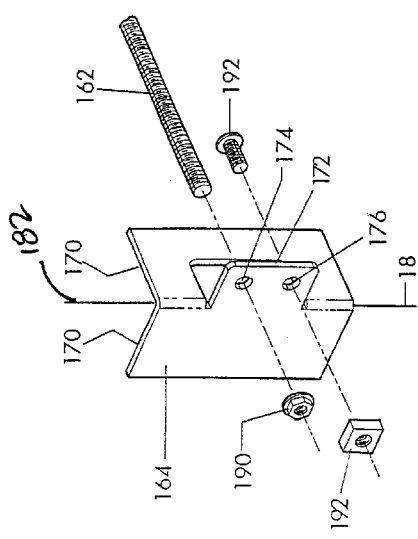
FIG. 26 is a fragmentary, partially exploded view of the hardware of the elevated support assembly of FIG. 25.
Figure 27:
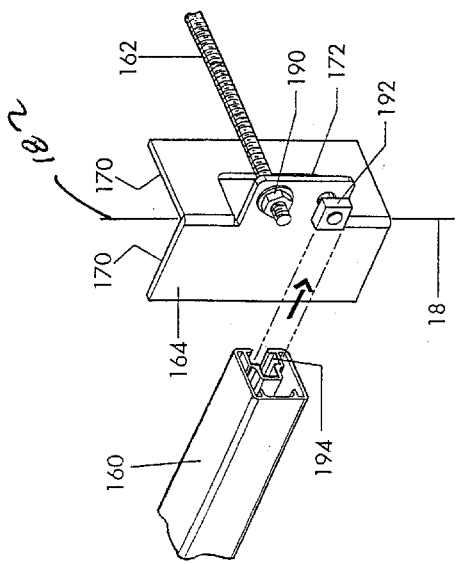
FIG. 27 is a fragmentary, exploded view of the hardware and one of the elongated supports of the elevated support assembly of FIG. 25.
Figure 28:
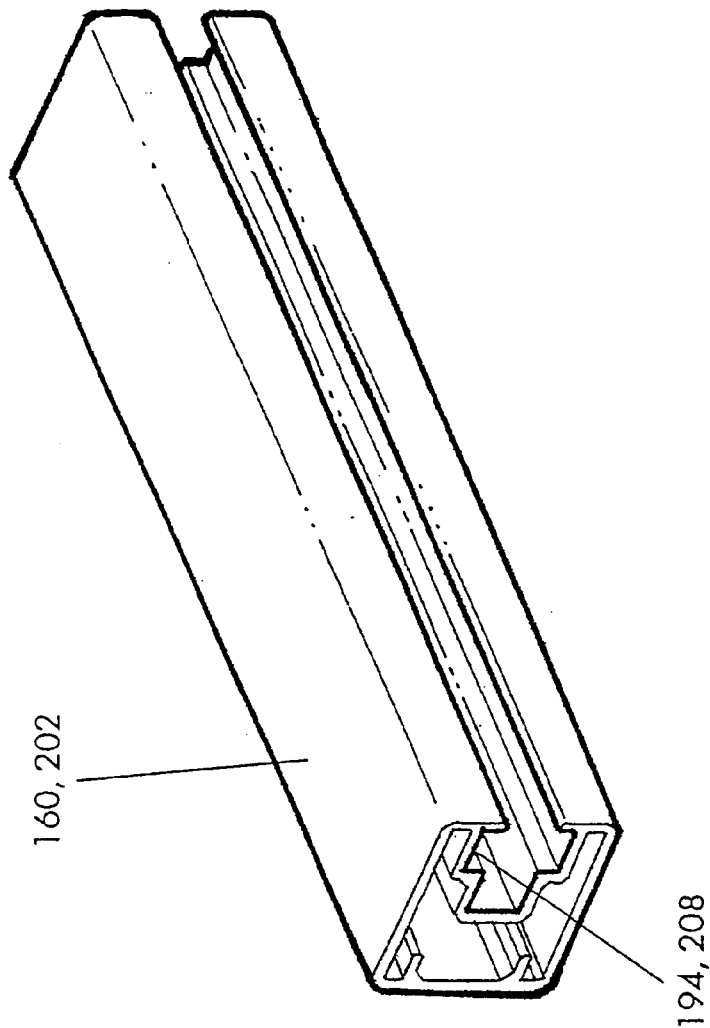
FIG. 28 is a perspective view of one of the elongated supports of the elevated support assembly of FIG. 25.

Additionally, if desired, the frame assembly 14 can be secured to, and supported by, the discharge power ventilator or other equipment at an elevation relative to the roof or other surface in any suitable manner. In a preferred embodiment, for example, the frame assembly 14 may be supported by a pair of elongated supports 160 that are supported by a pair of threaded rods 162, which are secured to the discharge power ventilator 18 by corner brackets 164. In the embodiment of FIGS. 25–27, the top and bottom ends of the illustrated corner brackets 164 are generally L-shaped. Each corner bracket 164 includes a pair of engaging surfaces 170 for engaging the discharge power ventilator 18, and a tongue 172 extending away from the ventilator for engaging one of the threaded rods 162 and the elongated supports 160. Each of the tongues 172 defines a hole 174 adapted to receive one of the threaded rods 162 and a hole 176 to receive the hardware 192 for the elongated support 160.

In the preferred embodiment, each of the corner brackets 164 initially is positioned on the corner 182 of the discharge power ventilator 18 or other equipment such that the engaging surfaces 170 of the corner brackets 164 engage the corners of the equipment. If desired, two-sided tape may be used on the engaging surfaces to initially secure the corner brackets at the desired elevation. The threaded rods 162 are inserted through respective holes 174 of the corner brackets 164, and are secured to the corner brackets by a hexnut 190. The supports 160 are then secured to the corner bracket 164 by fasteners 192 that are slidably received by an elongated channel 194 defined by each of the supports. The frame assembly 14 is then secured to the supports by an angle bracket 196 that is received within the ends of the supports 160 by fasteners 198.

Figure 33:
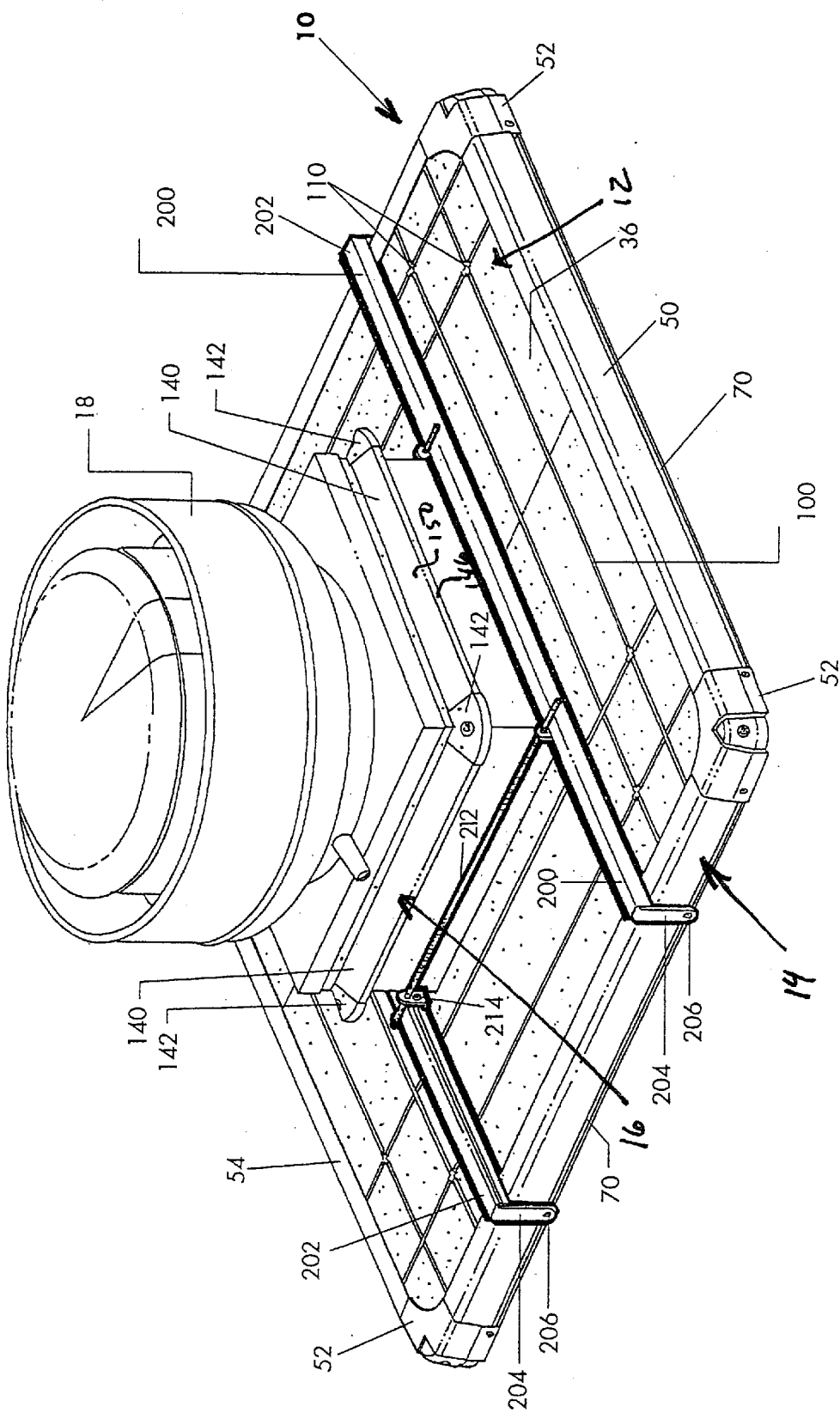
FIG. 33 is a perspective view of an effluent containment assembly in accordance with an other embodiment of the invention surrounding a discharge power ventilator, including a windbar assembly for preventing the filters from being blown out of the frame assembly in accordance with an other embodiment of the invention.
Figure 34:
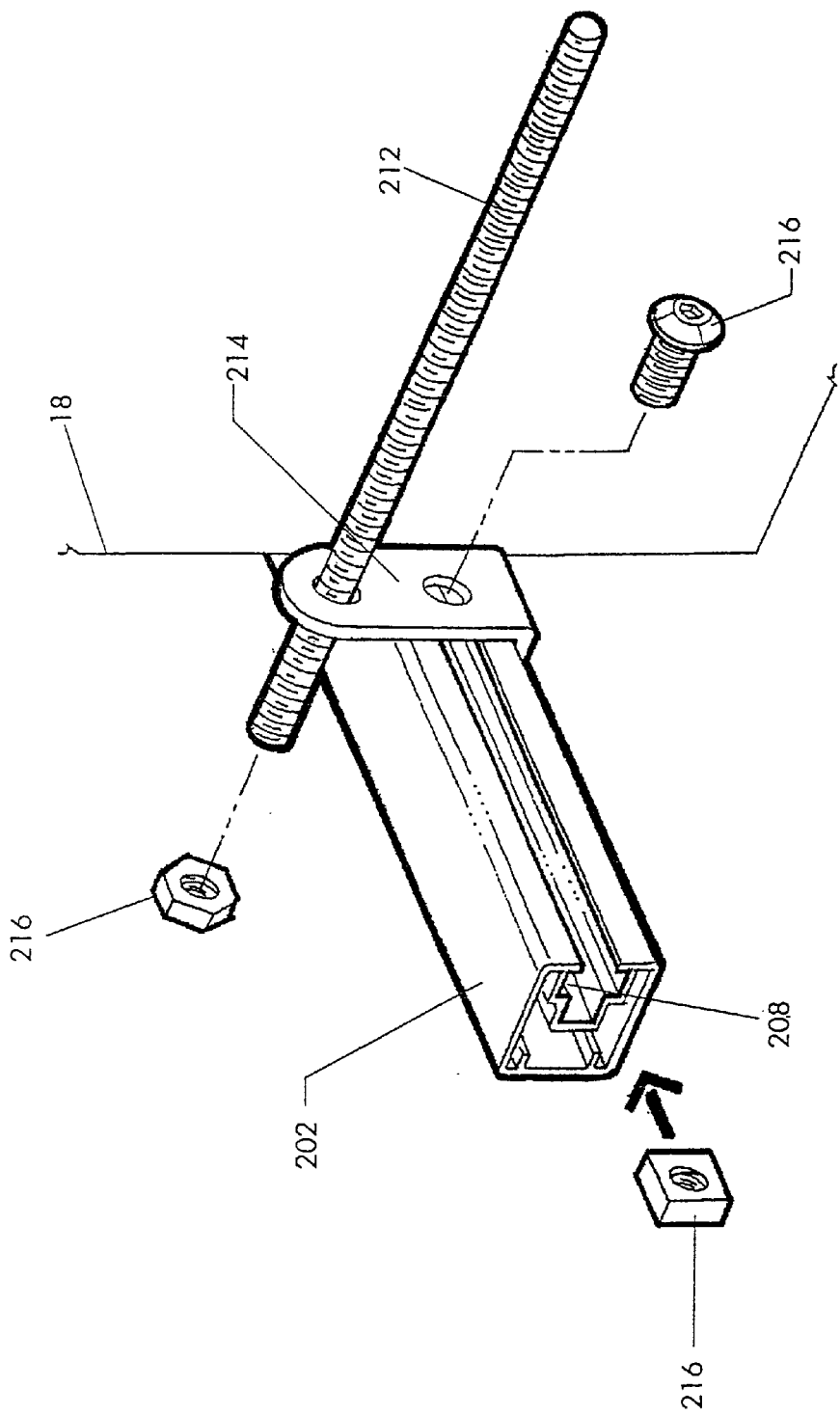
FIG. 34 is a fragmentary, exploded view of the hardware for securing the windbars to the corners of the discharge power ventilator of assembly of FIG. 33.
Figure 35:
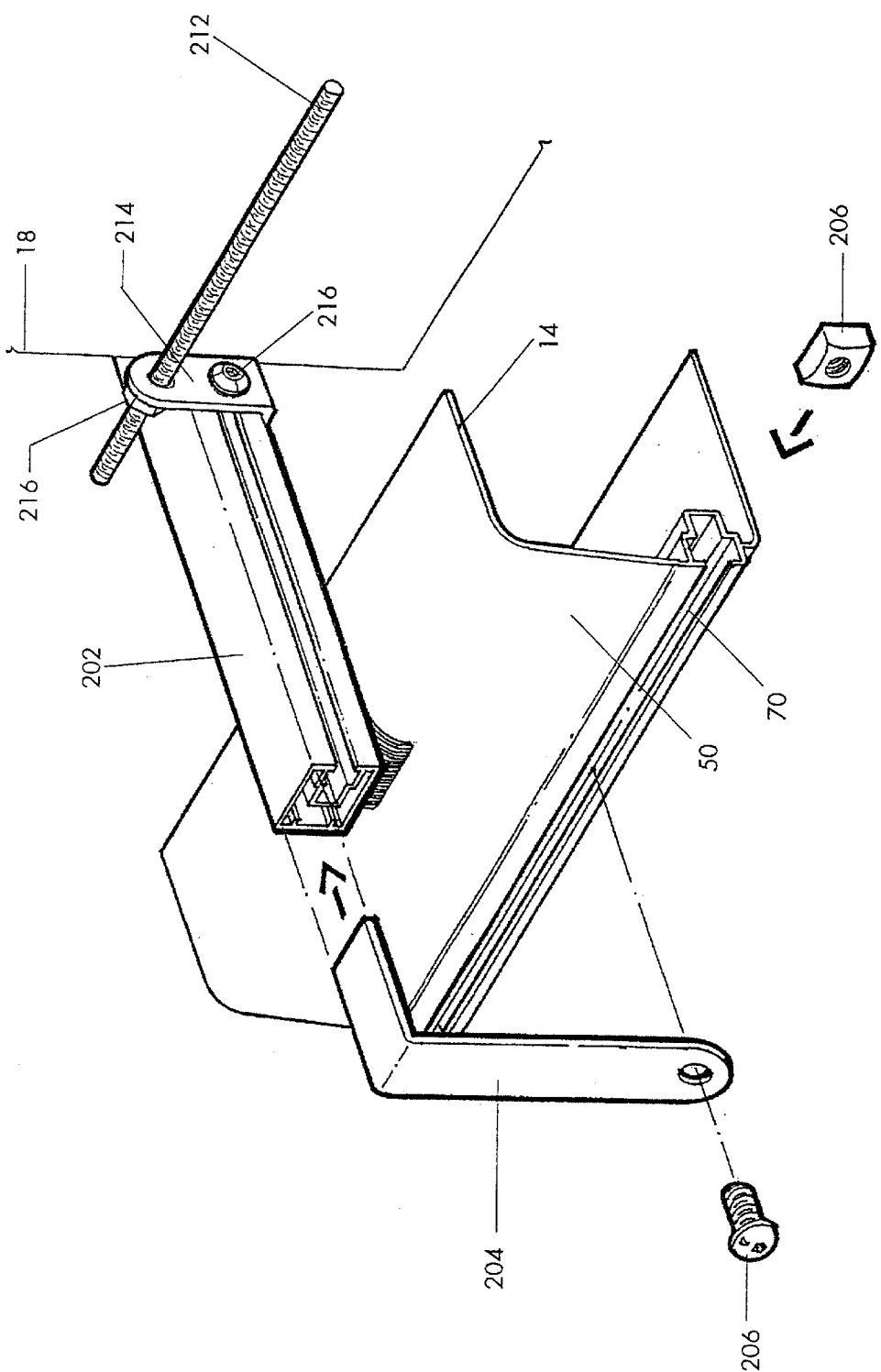
FIG. 35 is a fragmentary view of the hardware for securing the windbars to the frame members of the effluent containment assembly of FIG. 33.

Additionally, if desired, a windbar assembly 200 may be secured to the frame assembly 14, extending across the top of the layered composite 12 to prevent filters from being blown out of the frame assembly 14 and prevent the frame assembly from being blown off the roof or other surface. In the illustrated embodiment, the windbar assembly 200 comprises two or more windbars 202 (FIGS. 33 and 34), a frame strap 204 received within each end of the windbars, and a plurality of fasteners 206 engaging the frame straps and receivable within the channel 70 of the frame members 50 for engaging the frame straps and the frame members 50. Additionally, if desired, threaded rods 212, mounting plates 214 and fasteners 216 can be used to secure the windbars 202 to the discharge power ventilator 18 or other equipment.

Figure 20:
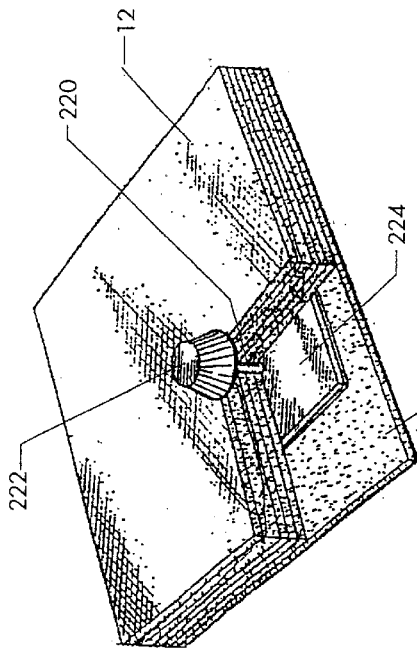
FIG. 20 is a broken perspective view of the layered composite of the effluent containment assembly, illustrating a fastener for securing the layers together in accordance with an other embodiment of the invention.
Figure 19:
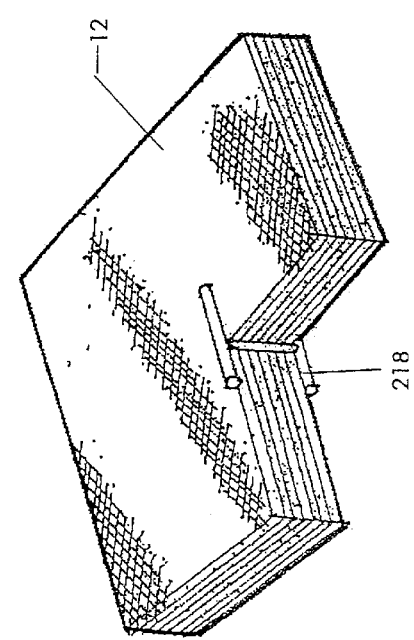
FIG. 19 is a broken perspective view of the layered composite of the effluent containment assembly, illustrating a fastener in the form of a barb for securing the layers together in accordance with one embodiment of the invention.
Figure 21:
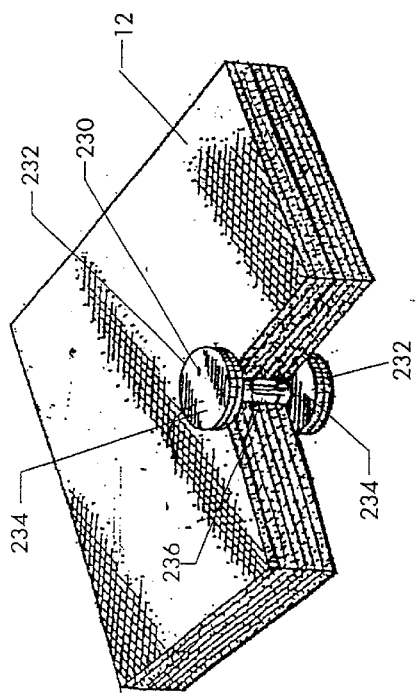
FIG. 21 is a broken perspective view of the layered composite of the effluent containment assembly, illustrating a fastener for securing the layers together in accordance with an other embodiment of the invention.

The separation and center filters 30 and 32 and barrier layer 34 desirably are secured together in any suitable manner, such as, for example, by a plurality of fasteners or an adhesive. If desired, the fasteners may be in the form of plastic I-shaped barbs 218 as illustrated in FIGS. 4 and 19. Alternatively, the fasteners may be if the type illustrated in FIG. 20, each of which includes a stem 220, a cap nut 222 engageable with one end of the stem, and a plate 224 fixedly secured to the other end of the stem. The plate is secured to one side of the barrier layer 34 by an adhesive or the like, and the stem 220 extends through the separation and center filters 30 and 32. The cap nut 222 engages the one end of the stem 220 such that the separation and center filters 30 and 32 are disposed between the cap nut and the plate 224.

The fastener in 21 is a ratchet fastener 230 that includes a pair of mating elements 232, each of which includes a head 234 and a stem 236. The separation and center filters 30 and 32 and the barrier layer 34 are disposed between the heads 234. If desired, a sealing washer 238 may be disposed both between one of the heads 234 and the separation filter 30 and between the other head and the barrier layer 34. The fastener 230 may be constructed of any suitable material such as, for example, nylon.

Figure 22:
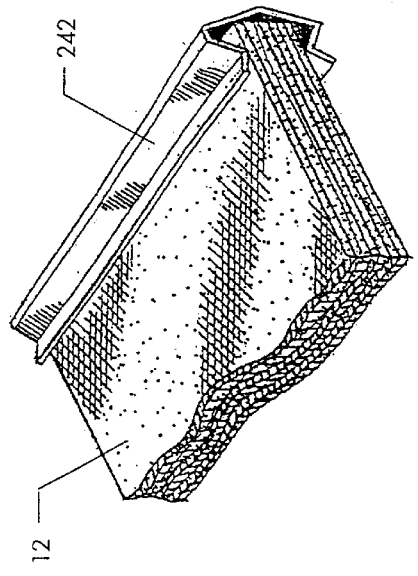
FIG. 22 is a broken perspective view of the layered composite of the effluent containment system, illustrating an edge clip for securing the layers together in accordance with an other embodiment of the present invention.

In the embodiment of FIG. 22 a clip 242 is used to secure together the separation and center filters 30 and 32 and the barrier layer 34. The clip 242 may extend along all or some of the length of one of the sides of the layered composite 12. If desired, other clips 242 may be used along other sides of the composite 12. In an alternative embodiment, adhesive may be used to secure together the separation and center filters 30 and 32 and the barrier layer 34.

Accordingly, the layered composite 12 in accordance with the present invention has a relatively high effluent absorption rate and is also able to retain a high volume of effluent. The layered composite 12 can be easily secured within the frame assembly 14. Additionally, the frame assembly 14 in accordance with the present invention is easy to assemble and relatively cost effective to manufacture. It also can be readily installed to equipment at an elevation. The effluent containment assembly 10 minimizes the damaging effects of effluent discharged from the ventilation system or other effluent source.

The foregoing description is for purposes of illustration only and is not intended to limit the scope of protection accorded this invention.

The claimed invention is:

1. A containment assembly for collecting effluent comprising a layered composite of materials, the layered composite including:
    (a) a separation filter layer for absorbing the effluent and for repelling at least some of any water present with the effluent, the separation filter layer comprising a material having a porosity sufficient to permit passage of effluent therethrough;
    (b) a center filter layer disposed below the separation filter layer for absorbing the effluent absorbed by the separation filter layer and for repelling at least some of any water included with the effluent passing through the separation filter, the center filter layer comprising a material having a porosity less than the porosity of the material of the separation filter layer and an effluent absorbency rate greater than the effluent absorbency rate of the material of the separation filter layer; and
    (c) a barrier layer disposed below the center filter layer, the barrier layer for substantially preventing the passage of any effluent from the center filter layer beyond the barrier layer.

2. The containment assembly of claim 1 wherein the separation filter layer is comprised of polypropylene material.

3. The containment assembly of claim 1 wherein the center filter layer is comprised of polypropylene material.

4. The containment assembly of claim 1 wherein the center filter layer is comprised of a plurality of layers of polypropylene material.

5. The containment assembly of claim 1 wherein the barrier layer is comprised of a substantially water impervious material.

6. The containment assembly of claim 1 wherein the barrier layer is comprised of polyethylene.

7. The containment assembly of claim 1 wherein the layered composite includes top and bottom spacer layers, the top spacer layer being disposed above and in contact with the separation filter layer and the bottom spacer layer being disposed below and in contact with the barrier layer.

8. The containment assembly of claim 1 wherein the layered composite includes a fire shield layer.

9. The containment assembly of claim 8 wherein the layered composite includes a bottom spacer layer disposed below and in contact with the barrier layer, the fire shield layer disposed below and in contact with the bottom spacer layer.

10. The containment assembly of claim 8 wherein the fire shield layer comprises a sheet of sheet metal.

11. The containment assembly of claim 1 wherein the layered composite defines an aperture for receiving a portion of equipment discharging the effluent such that the layered composite substantially surrounds the portion.

12. The containment assembly of claim 1 wherein the separation filter layer includes a pair of aligning sections, the center filter layer includes a pair of aligning sections and the barrier layer includes a pair of aligning sections.

13. The containment assembly of claim 12 wherein one aligning section of each pair of aligning sections includes an edge overlapping an edge of the other aligning section of each pair of aligning sections.

14. The containment assembly of claim 13 wherein the layered composite defines an aperture for receiving a portion of equipment discharging the effluent such that the layered composite substantially surrounds the portion.

15. The containment assembly of claim 1 wherein the barrier layer includes a pair of aligning sections.

16. The containment assembly of claim 15 wherein one aligning section includes an edge overlapping an edge of the other aligning section.

17. The containment assembly of claim 1 further comprising a frame assembly receiving the layered composite, the frame assembly comprising a plurality of frame members, and a plurality of corner members, each corner member slidingly engaged with a respective pair of the frame members.

18. The containment assembly of claim 17 wherein the frame assembly further includes a plurality of pairs of fasteners, each pair of fasteners for securing the corner member to the respective pair of fasteners.

19. The containment assembly of claim 17 wherein each frame member is generally C-shaped and includes a bottom member, a top member, and a side member extending substantially the length of the frame member, the bottom member extending farther than the top member to support the layered composite.

20. The containment assembly of claim 1 further comprising at least one pole assembly for supporting the layered composite, the pole assembly including a plurality of holding poles oriented in a grid pattern on one side of the composite.

21. The containment assembly of claim 20 wherein the pole assembly further comprises a plurality of connectors, each connector securing together a pair of holding poles.

22. The containment assembly of claim 21 wherein each connector is flexible and defines two pairs of holes, each pair of holes adapted to align and receive one of the holding poles.

23. The containment assembly of claim 1 further comprising a frame assembly receiving the layered composite and a windbar assembly for securing the layered composite within the frame assembly, the windbar assembly comprising a plurality of windbars, a frame strap received within each end of the windbars, and a plurality of fasteners engaging the frame straps and engageable with the frame assembly.

24. The containment assembly of claim 1 further comprising flashing for deflecting the effluent onto the layered composite.

25. The containment assembly of claim 1 further comprising a frame assembly and a securing assembly for securing the frame assembly to equipment at an elevation relative to a surface to be protected by the containment assembly.

26. The containment assembly of claim 25 wherein the securing assembly comprises a plurality of elongated supports and a plurality of threaded rods for supporting the elongated supports, the securing assembly further comprising a plurality of brackets and mounting plates, each corner bracket for engaging a portion of the equipment.

27. A containment assembly for collecting effluent comprising a layered composite of materials and a frame assembly receiving the layered composite, the frame assembly including a plurality of frame members, and a plurality of corner members, each corner member slidingly engaged with a respective pair of the frame members.

28. The containment assembly of claim 27 wherein the frame assembly further includes a plurality of pairs of fasteners, each pair of fasteners for securing the corner member to the respective pair of fasteners.

29. The containment assembly of claim 27 wherein the frame assembly includes a plurality of curved strips for engaging corner members with the respective pairs of frame members, each strip being secured to a respective corner member and being disposed within a channel defined by the respective corner member and having two ends, and wherein each frame member defines a channel, each end of the strip being slidingly received by the channel of a respective frame member.

30. The containment assembly of claim 27 wherein the frame assembly includes a pair of fasteners secured to each corner member and wherein each frame member defines a channel slidably receiving a respective fastener, the fasteners for securing the respective corner members with the respective pairs of frame members.

31. The containment assembly of claim 30 wherein the frame assembly includes a plurality of curved strips for engaging the corner members with the respective pairs of frame members, each strip being secured to a respective corner member by a pair of the fasteners and being disposed within a channel defined by the respective corner member and having two ends, each end of the strip being slidingly received by the channel of a respective frame member.

32. The containment assembly of claim 31 wherein each corner member includes a pair of corner arms, each corner arm defining an aperture for receiving a respective fastener.

33. The containment assembly of claim 27 wherein each corner member includes a pair of abutting surfaces for abutting the ends of respective frame members to facilitate positioning of the frame members within the corner members.

34. The containment assembly of claim 33 wherein each corner member includes a bottom member having a top surface, the top surfaces being formed on the top surface.

35. The containment assembly of claim 27 wherein each frame member is generally C-shaped and includes a bottom member, a top member, and a side member extending substantially the length of the frame member, the bottom member extending farther than the top member to support the layered composite.

36. The containment assembly of claim 27 further comprising at least one pole assembly for supporting the layered composite, the pole assembly including a plurality of holding poles oriented in a grid pattern on one side of the composite.

37. The containment assembly of claim 36 wherein the pole assembly further comprises a plurality of connectors, each connector securing together a pair of holding poles.

38. The containment assembly of claim 37 wherein each connector is flexible and defines two pairs of holes, each pair of aligned holes adapted to align and receive one of the holding poles.

39. The containment assembly of claim 27 further comprising a windbar assembly for securing the layered composite within the frame assembly, the windbar assembly comprising a plurality of windbars, a frame strap received within each end of the windbars, and a plurality of fasteners engaging the frame straps and engageable with the frame assembly.

40. The containment assembly of claim 27 further comprising flashing for deflecting the effluent onto the layered composite.

41. The containment assembly of claim 27 further comprising an elevated support assembly for securing the frame assembly to equipment at an elevation relative to a surface to be protected by the containment assembly.

42. The containment assembly of claim 41 wherein the securing assembly comprises a plurality of elongated supports and a plurality of threaded rods for supporting the elongated supports, the securing assembly further comprising a plurality of brackets and mounting plates, each corner bracket for engaging a portion of the equipment.

43. The containment assembly of claim 1 wherein the center filter layer is in contact with the separation filter layer and the barrier layer is in contact with the center filter layer.

44. A containment assembly for collecting effluent comprising: a frame attachable to a roof discharge ventilator adjacent a discharge area of the roof discharge ventilator; a layered composite of effluent absorbing materials carried by said frame, said frame defining an upper opening exposing said layered composite of effluent-absorbing materials; and a flashing member disposed intermediate said discharge area and said frame opening for directing effluent to said frame opening for absorption by said layered composite.

45. A containment assembly as recited in claim 44, wherein said frame is attached to one side of said roof discharge ventilator.

46. A containment assembly according to claim 44, wherein said frame surrounds said roof discharge ventilator, and said flashing correspondingly extends about the periphery of said ventilator.

47. The containment assembly of claim 44 wherein the flashing is for mounting the frame to the ventilator.

48. A containment assembly for collecting effluent comprising a layered composite of materials, the layered composite including a plurality of layers of effluent trapping and filtering materials and a fire shield layer.

49. The containment assembly of claim 48 wherein the plurality of layers of effluent trapping and filtering materials comprise:
   (a) a separation filter layer for absorbing the effluent and for repelling at least some of any water present with the effluent, the separation filter layer comprising a material having a porosity sufficient to permit passage of effluent therethrough;
   (b) a center filter layer disposed below the separation filter layer for absorbing the effluent absorbed by the separation filter layer and for repelling at least some of any water included with the effluent passing through the separation filter, the center filter layer comprising a material having a porosity less than the porosity of the material of the separation filter layer and an effluent absorbency rate greater than the effluent absorbency rate of the material of the separation filter layer; and
   (c) a barrier layer disposed below the center filter layer, the barrier layer for substantially preventing the passage of any effluent from the center filter layer beyond the barrier layer.

50. The containment assembly of claim 49 wherein the fire shield layer is disposed below the barrier layer.

51. The containment assembly of claim 48 wherein the fire shield layer comprises sheet metal.

52. The containment assembly of claim 48 wherein the fire shield layer comprises silicone rubber impregnated fiberglass fabric.

53. The containment assembly of claim 48 wherein the fire shield layer comprises a luminized fiberglass fabric.

54. The containment assembly of claim 48 wherein the fire shield layer comprises galvanized steel.

* * * * *